(12) United States Patent
Schreter

(10) Patent No.: US 11,079,942 B2
(45) Date of Patent: Aug. 3, 2021

(54) SHARED FILESYSTEM FOR DISTRIBUTED DATA STORAGE SYSTEM

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 283 days.

(21) Appl. No.: 16/029,451

(22) Filed: Jul. 6, 2018

(65) Prior Publication Data

US 2019/0012329 A1 Jan. 10, 2019

Related U.S. Application Data

(60) Provisional application No. 62/530,075, filed on Jul. 7, 2017.

(51) Int. Cl.
| | |
|---|---|
| *G06F 17/00* | (2019.01) |
| *G06F 3/06* | (2006.01) |
| *G06F 16/11* | (2019.01) |
| *H04L 29/14* | (2006.01) |
| *G06F 11/14* | (2006.01) |

(Continued)

(52) U.S. Cl.
CPC ......... *G06F 3/0631* (2013.01); *G06F 3/0604* (2013.01); *G06F 3/064* (2013.01); *G06F 3/067* (2013.01); *G06F 3/0608* (2013.01); *G06F 3/0611* (2013.01); *G06F 3/0644* (2013.01); *G06F 3/0652* (2013.01); *G06F 3/0659* (2013.01); *G06F 3/0673* (2013.01); *G06F 11/1446* (2013.01); *G06F 11/1471* (2013.01); *G06F 11/1658* (2013.01); *G06F 12/0802* (2013.01); *G06F 12/1009* (2013.01); *G06F 16/128* (2019.01); *G06F 16/134* (2019.01); *G06F 16/162* (2019.01); *G06F 16/176* (2019.01); *G06F 16/1824* (2019.01); *G06F 16/215* (2019.01); *G06F 16/2358* (2019.01); *G06F 16/245* (2019.01); *G06F 16/24552* (2019.01); *G06F 16/27* (2019.01); *G06F 16/951* (2019.01); *H04L 67/1097* (2013.01); *H04L 67/2809* (2013.01); *H04L 67/2842* (2013.01); *H04L 69/40* (2013.01);

(Continued)

(58) Field of Classification Search
None
See application file for complete search history.

(56) References Cited

U.S. PATENT DOCUMENTS

| | | | |
|---|---|---|---|
| 5,758,334 A * | 5/1998 | Knight, III | ............... G06F 16/10 |
| 5,878,431 A | 3/1999 | Potterveld et al. | |

(Continued)

*Primary Examiner* — Hasanul Mobin
(74) *Attorney, Agent, or Firm* — Mintz Levin Cohn Ferris Glovsky and Popeo, P.C.

(57) ABSTRACT

A method for controlling access to a shared filesystem stored in a distributed data storage system is provided. The method can include storing a file comprising a shared filesystem as an inode object and a series of data block objects comprising the shared filesystem. Responding to a request from a client to open the file can include generating, in the shared filesystem, a client object, an open file object, and a client index object. The client object can be linked to the open file object and the client index object. The open file object and the client index object can be further linked to the inode object to indicate the file being accessed by the client. Related systems and articles of manufacture, including computer program products, are also provided.

16 Claims, 17 Drawing Sheets

(51) Int. Cl.

| | | |
|---|---|---|
| *H04L 29/08* | (2006.01) | |
| *G06F 16/2455* | (2019.01) | |
| *G06F 12/0802* | (2016.01) | |
| *G06F 16/16* | (2019.01) | |
| *G06F 16/182* | (2019.01) | |
| *G06F 16/176* | (2019.01) | |
| *G06F 16/13* | (2019.01) | |
| *G06F 12/1009* | (2016.01) | |
| *G06F 16/951* | (2019.01) | |
| *G06F 16/27* | (2019.01) | |
| *G06F 16/23* | (2019.01) | |
| *G06F 11/16* | (2006.01) | |
| *G06F 16/245* | (2019.01) | |
| *G06F 16/215* | (2019.01) | |

(52) U.S. Cl.
 CPC ...... *G06F 2201/84* (2013.01); *G06F 2201/85* (2013.01); *G06F 2212/604* (2013.01); *G06F 2212/652* (2013.01)

(56) References Cited

U.S. PATENT DOCUMENTS

| | | | |
|---|---|---|---|
| 6,058,400 A * | 5/2000 | Slaughter | G06F 16/10 |
| 7,849,223 B2 | 12/2010 | Malkhi et al. | |
| 9,971,526 B1 | 5/2018 | Wei | |
| 10,474,656 B1 | 11/2019 | Bronnikov | |
| 2005/0223005 A1* | 10/2005 | Shultz | G06F 12/084 |
| 2006/0045111 A1 | 3/2006 | Sinha | |
| 2009/0150566 A1 | 6/2009 | Malkhi et al. | |
| 2009/0216936 A1 | 8/2009 | Chu | |
| 2009/0287975 A1 | 11/2009 | Kim | |
| 2010/0002506 A1 | 1/2010 | Cho | |
| 2010/0027351 A1 | 2/2010 | Seol | |
| 2010/0174690 A1* | 7/2010 | Marcotte | G06F 16/178 707/695 |
| 2010/0293140 A1 | 11/2010 | Nishiyama | |
| 2011/0055494 A1* | 3/2011 | Roberts | G06F 3/0659 711/154 |
| 2011/0197023 A1 | 8/2011 | Iwamitsu | |
| 2012/0102298 A1 | 4/2012 | Sengupta | |
| 2012/0221811 A1* | 8/2012 | Sparkes | G06F 16/2343 711/159 |
| 2012/0246190 A1* | 9/2012 | Surtani | G06F 16/27 707/769 |
| 2013/0080348 A1 | 3/2013 | Pantaliano | |
| 2013/0275656 A1 | 10/2013 | Talagala | |
| 2013/0275818 A1 | 10/2013 | Okubo | |
| 2014/0059290 A1 | 2/2014 | Ross | |
| 2014/0215179 A1 | 7/2014 | Matsuhira | |
| 2014/0258242 A1* | 9/2014 | Kanfi | G06F 16/13 707/690 |
| 2014/0279920 A1 | 9/2014 | Madhavarapu | |
| 2014/0289358 A1 | 9/2014 | Lindamood et al. | |
| 2014/0304409 A1 | 10/2014 | Kamath | |
| 2015/0058291 A1 | 2/2015 | Earl | |
| 2015/0089185 A1 | 3/2015 | Brandyberry | |
| 2015/0310035 A1* | 10/2015 | Godman | G06F 9/467 707/751 |
| 2016/0026672 A1 | 1/2016 | Zhang | |
| 2016/0092593 A1* | 3/2016 | Peacock | G06F 16/182 707/796 |
| 2016/0105471 A1 | 4/2016 | Nunes et al. | |
| 2016/0224580 A1* | 8/2016 | Jain | G06F 16/134 |
| 2016/0308968 A1 | 10/2016 | Friedman | |
| 2016/0371296 A1* | 12/2016 | Passey | G06F 16/1734 |
| 2016/0371297 A1* | 12/2016 | Okun | G06F 16/168 |
| 2017/0083539 A1* | 3/2017 | Saxena | G06F 16/178 |
| 2017/0134276 A1 | 5/2017 | White | |
| 2017/0139596 A1 | 5/2017 | Hack | |
| 2017/0169069 A1* | 6/2017 | Manjunath | G06F 16/2365 |
| 2017/0295061 A1 | 10/2017 | Wittenschlaeger | |
| 2018/0011893 A1 | 1/2018 | Kimura | |
| 2018/0181583 A1* | 6/2018 | Godman | G06F 17/18 |
| 2019/0005079 A1 | 1/2019 | Li | |
| 2019/0171762 A1 | 6/2019 | Luke | |
| 2019/0205993 A1 | 7/2019 | Rodriguez | |

* cited by examiner

SHARED FILESYSTEM FOR DISTRIBUTED DATA STORAGE SYSTEM

RELATED APPLICATION

This application claims priority to U.S. Provisional Application No. 62/530,075 entitled MULTI-CLOUD TOPOLOGY AND CONTAINER METADATA MANAGEMENT and filed on Jul. 7, 2017, the disclosure of which is incorporated herein by reference in its entirety.

TECHNICAL FIELD

The subject matter described herein relates generally to distributed computing and more specifically to a shared filesystem within a distributed data storage system.

BACKGROUND

A distributed data storage system can store data across multiple computing nodes. These computing nodes can be located across different racks, availability zones, and/or data centers in the distributed data storage system. Furthermore, the distributed data storage system can be configured to store data from multiple tenants. Data from each individual tenant can be organized into one or more data partitions and stored in at least one data container. Moreover, each data partition can be stored in one of the computing nodes in the distributed data storage system. As such, locating data within the distributed data storage system, for example, in order to respond to a query (e.g., a structured query language (SQL) statement and/or the like), can require identifying the data partition and/or the data container holding the data. Alternatively and/or additionally, locating data within the distributed data storage system can require identifying the data center, availability zone, rack, and/or computing node storing the data.

SUMMARY

Systems, methods, and articles of manufacture, including computer program products, are provided for page list based data persistency. In one aspect, there is provided a system. The system may include at least one data processor and at least one memory. The at least one memory may store instructions that result in operations when executed by the at least one data processor. The operations may include: storing, at the distributed data storage system, a file that is part of a shared filesystem, the file being stored as an inode object and a series of data block objects in the shared filesystem; and responding to a first request from a client to open the file at least by generating, in the shared filesystem a first open file object and a client index object, the first open file object and the client index object being linked to a client object corresponding to the client, the first open file object and the client index object further being linked to the inode object to at least indicate the file being accessed by the client.

In some variations, one or more features disclosed herein including the following features can optionally be included in any feasible combination. The inode object can be further linked to another inode object corresponding to a directory in the shared filesystem, a directory entry object, and/or a directory entry index object. The directory can correspond to a directory in the shared filesystem. Linking the inode object to the other inode object corresponding to the directory, the directory entry object, and/or the directory entry index object can indicate that the file corresponding to the inode object is part of the directory corresponding to other inode object.

In some variations, the client object can be associated with an access time object storing a time when the client corresponding to the client object last accessed the shared filesystem. The access time object can be replaced with another access time object in response to the client updating the time when the client corresponding to the client object last accessed the shared filesystem. A timeout of a connection between the client and the shared filesystem can be determined based at least on the access time object. In response to determining that the connection between the client and the shared filesystem has timed out, the client object, the first open file object, and/or the client index object can be removed from the shared filesystem. The removal of the client object, the first open file object, and/or the client index object can trigger a deletion of the inode object and/or the series of data block objects holding the file corresponding to the inode object based at least on the inode object not being referenced by another client and/or a directory.

In some variations, the response to a second request from the client to open the file can include generating a second open file object. The second open file object can be associated with a different discriminator value than the first open file object.

In some variations, the inode object can be generated. The inode object can be linked to a directory entry object and the series of data block objects corresponding to one or more data blocks storing the file corresponding to the inode object. The inode object and another inode object corresponding to the directory further being linked to a directory entry object and/or to a directory entry index object to at least indicate the file corresponding to the inode object being part of a directory corresponding to the other inode object corresponding to the directory.

In some variations, a response to a second request from the client to close the file can include deleting the first open file object and/or the client index object. In response to determining that a link count of the inode object is zero and the inode object is not associated with any client index objects, the inode object and/or the series of data block objects storing the file can be deleted.

In some variations, a response to a second request to read from and/or write to the file corresponding to the inode object can include iterating through the one or more data blocks. The iteration can be based at least on a composite key stored in each data block object in the series of data block objects. The composite key can include an inode identifier of the file and a block index computed based at least on an offset associated with a corresponding data block. Writing to one or more unallocated blocks for storing the file corresponding to the inode object further comprises: allocating a data block for storing data being written to the file; generating a data block object corresponding to the data block, the data block object being linked to the inode object corresponding to the file; and updating a block count value stored in the inode object.

In some variations, the distributed data storage system can include a first computing node and a second computing node. One or more partitions of the shared filesystem can be stored at a key-value store at each of the first computing node and the second computing node. Each file in the shared filesystem can be stored as a key-value pair in the key-value store at each of the first computing node and the second computing node.

In some variations, the client object can be created in response to the client connecting to the shared filesystem. The client object can be removed in response to the client disconnecting from the shared filesystem.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
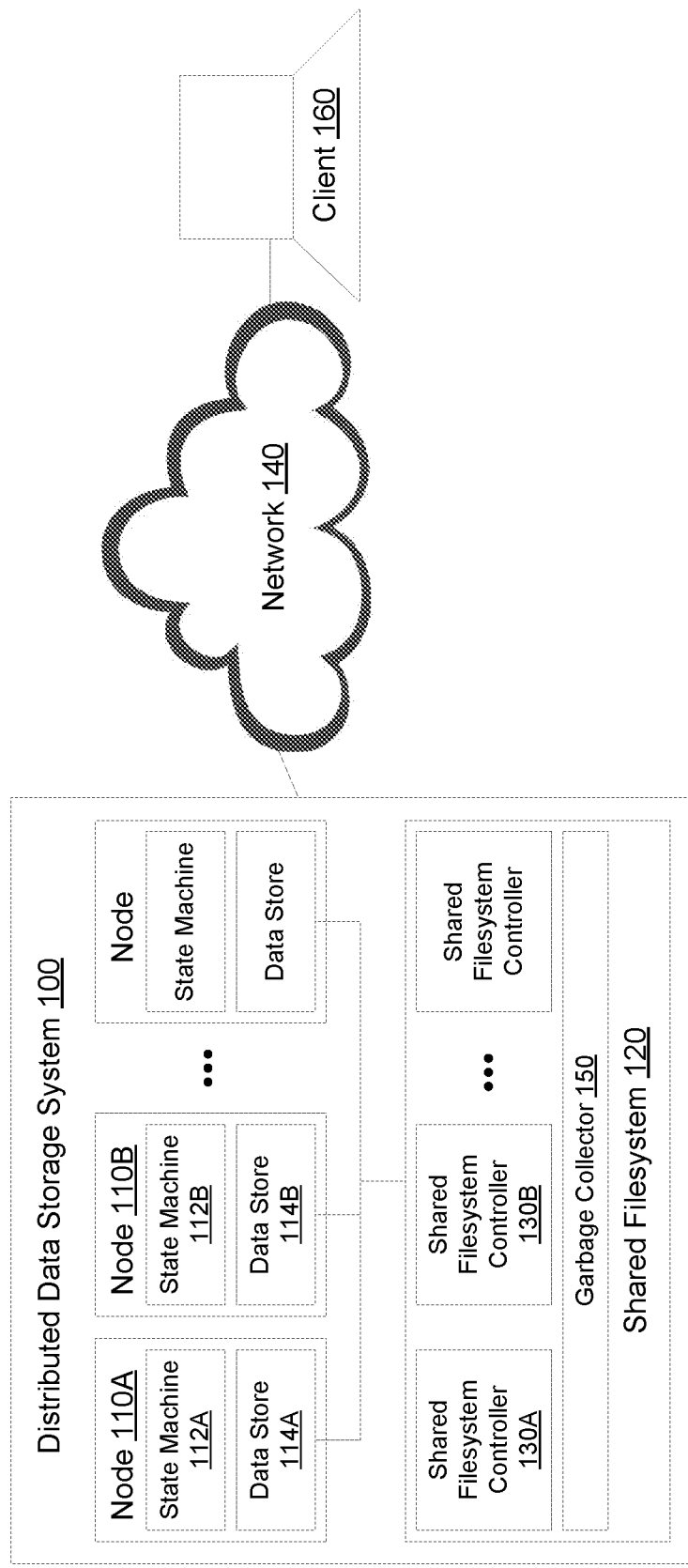
FIG. 1 depicts a system diagram illustrating a distributed data storage system consistent with some implementations of the current subject matter.

A distributed data storage system can include a plurality of computing nodes, each of which store data in fixed and/or variable sized blocks of memory such as, for example, memory pages and/or the like. Each computing node in the distributed data storage system can be associated with a state machine configured to track changes to the data stored at the computing node. For instance, applying changes to the data stored at a computing node can trigger one or more state transitions at the state machine associated with the computing node. Snapshots of the state machine can be created at various checkpoints in order to capture the state of the data stored at the computing node at each checkpoint. Furthermore, the changes applied to the data subsequent to a checkpoint can be recorded in a log such as, for example, a write ahead log and/or the like. In the event of a crash at the computing node, the data at the computing node can be restored to a state prior to the crash by at least applying the changes in the log to a snapshot of the state machine created prior to the crash.

A shared file system can be created on top of a distributed data storage system for storing common files including, for example, installation executable files, configuration files, trace files, and/or the like. A conventional shared filed system may be implemented by storing the common files at a central location such as, for example, a network file system (NFS) server, a server message block (SMB)/common Internet filesystem (CIFS) server, and/or the like. But centralizing the shared filesystem may give rise to a single point of failure in the distributed data storage system while local disks at the computing nodes within the distributed data storage system are left underutilized. As such, according to some implementations of the current subject matter, a shared filesystem may be implemented by storing replicas of the common files at multiple computing nodes within the distributed data storage system. For instance, the common files may be stored in key-value stores across multiple computing nodes.

In some implementations of the current subject matter, the shared filesystem can include a plurality of objects for tracking and/or controlling access to the shared filesystem including, for example, the files and/or directories included in the shared filesystem. For example, an inode object can represent a file included in the shared filesystem and/or a directory in the shared filesystem. To indicate that the file is part of a directory in the shared filesystem, the inode object of the file can be linked to another inode object corresponding to the directory as well as a directory entry object that is further linked to a directory entry index object. When a client of the distributed data storage system connects to the shared filesystem, a client object can be generated to represent the client while an open file object can be generated to represent the files being accessed by the client. The client object and/or the open file object can further be linked to one or more client index objects, which can represent the files being accessed by the client by at least being linked to the corresponding inode objects. According to some implementations of the current subject matter, a garbage collector can be configured to remove at least some of the objects within the shared filesystem. For instance, a client object and/or an index object can be removed upon termination of the connection between a corresponding client and the shared filesystem. Meanwhile, closing a file and/or a directory can trigger the removal of the corresponding open file object, directory entry object, and/or directory entry index object.

FIG. 1 depicts a system diagram illustrating a distributed data storage system 100 consistent with implementations of the current subject matter. Referring to FIG. 1, the distributed data storage system 100 can include a plurality of computing nodes including, for example, the first computing node 110A and the second computing node 110B. Furthermore, as shown in FIG. 1, the distributed data storage system 100 can be communicatively coupled, via a network 140, with one or more clients including, for example, a client 160. The network 140 can be any wired and/or wireless network including, for example, a public land mobile network (PLMN), a local area network (LAN), a virtual local area network (VLAN), a wide area network (WAN), the Internet, and/or the like. Meanwhile, the client 160 can be any processor-based device including, for example, a mobile device, a wearable device, a tablet computer, a desktop computer, a laptop computer, and/or the like.

A shared filesystem 120 can be created on top of the distributed data storage system 100 and can store a plurality of common files such as, for example, installation executable files, configuration files, trace files, and/or the like. In some implementations of the current subject matter, one or more partitions of the shared filesystem 120120 including the common files can be stored at each of the plurality of computing nodes including, for example, in a first data store 112A at the first computing node 110A and/or in a second data store 112B the second computing node 110B. Furthermore, each partition of the shared filesystem 120 can be coupled with a shared filesystem controller. For example, as shown in FIG. 1, a partition of the shared filesystem 120 stored in the first data store 114A at the first computing node 110A can be coupled with a first shared filesystem controller 130A while another partition of the shared filesystem 120 stored in the second data store 114B at the second computing node 110B can be coupled with a second shared filesystem controller 130B. It should be appreciated that consistency across the data stored at the first computing node 110A and the second computing node 110B including, for example, the partitions of the shared filesystem 120, can be maintained based on a consensus protocol in which changes to the data are propagated from a leader node to one or more follower nodes. Examples of consensus protocols consistent with some implementations of the current subject matter are described in U.S. patent application Ser. No. 15/363,738.

For example, in some implementations of the current subject matter, the first computing node 110A can serve as a leader node while the second computing node 110B can act as a follower node. As such, the first computing node 110A can respond to one or more requests from the client 160, for example, by applying the corresponding changes to the data stored at the first computing node 110A, for example, in the first data store 114A. These changes can include, for example, additions, deletions, and/or updates with respect to the one or more partitions of the shared filesystem 120 stored in the first data store 114A at the first computing node 110A. Moreover, these changes can trigger one or more state transitions at a first state machine 112A associated with the first computing node 110A, which can be configured to track, via the state transitions, the changes to the data in the first data store 114A. A second state machine 112B at the second computing node 110B can be configured to track, via state transitions, the changes to the data in the second data store 114B which, as noted, can also include one or more partitions of the shared filesystem 120. As part of the consensus protocol, changes to the data stored at the first computing node 110A serving as the leader node can be propagated to the second computing node 110B acting as a follower node. Consistency across the replicas of the data stored at the first computing node 110A and the second computing node 110B can be maintained by at least applying the same changes to the data including, for example, the replica of shared filesystem 120, stored at the second computing node 110B.

In some implementations of the current subject matter, the first data store 114A and/or the second data store 114B can be a key-value store configured to store data in the form of one or more key-value pairs (KVPs). As such, the first shared filesystem controller 130A and/or the second shared filesystem controller 130B can be configured to translate requests, for example, from the client 160, into one or more calls to a key-value store. For instance, the first data store 114A and/or the second data store 114B can be a hybrid key-value store in which data records that do not exceed a threshold size (e.g., 2 kilobytes and/or a different size) are stored in an in-memory key-value store and data records that do exceed the threshold size (e.g., 2 kilobytes and/or a different size) are stored in a secondary data store. It should be appreciated that an in-memory key-value store can be implemented using any type of persistence that supports low latency access including, for example, random access memory (RAM) and/or the like. Meanwhile, the secondary data store can be implemented using any type of persistence that supports high capacity storage including, for example, hard disk and/or the like.

Referring again to FIG. 1, each computing node in the distributed data storage system 100 can store one or more partitions of the shared filesystem 120 and therefore be coupled with a respective instance of a shared filesystem controller. For example, the first computing node 110A can be coupled with the first shared filesystem controller 130A while the second computing node 110B can be coupled with the second shared filesystem controller 130B. In some implementations of the current subject matter, the first shared filesystem controller 130A and/or the second shared filesystem controller 130B can be configured to respond to requests, for example, from the client 160, that requires access to one or more partitions of the shared filesystem 120. For example, the client 160 may request to perform an operation that requires reading and/or writing one or more of the common files included in the shared filesystem 120. As noted, one or more partitions of the shared filesystem 120 can be stored across different computing nodes within the distributed data storage system including, for example, the first computing node 110A and/or the second computing node 110B. Accordingly, the first shared filesystem controller 130A and/or the second shared filesystem controller 130B can respond to a request from the client 160 by at least accessing the one or more partitions of the shared filesystem 120 stored at the first computing node 110A and/or the second computing node 110B.

In some implementations of the current subject matter, the implementation of shared filesystem 120 can include a plurality of objects. An object may store metadata that includes, for example, one or more attributes of the object, relationships to other objects in the shared filesystem 120, and/or the like. For example, an inode object can represent a file included in the shared filesystem. To indicate that the file is part of a directory in the shared filesystem, the inode object of the file can be linked to another inode object corresponding to the directory as well as a directory entry object that is further linked to a directory entry index object. When a client of the distributed data storage system connects to the shared filesystem, a client object can be generated to represent the client while an open file object can be generated to represent the files being accessed by the client. The client object and/or the open file object can further be linked to one or more client index objects, which can represent the files being accessed by the client by at least being linked to the corresponding inode objects.

It should be appreciated that the links between objects in the shared filesystem can be implemented as hard links and/or soft links. A soft link between two objects can be achieved by storing an identifier of one object as part of the metadata included in the other inode object (e.g., stored in a data block of a symbolic link inode). Meanwhile, a hard link to an object can be achieved by linking the inode object to another directory inode and incrementing the link count associated with the inode object.

Figure 2A:
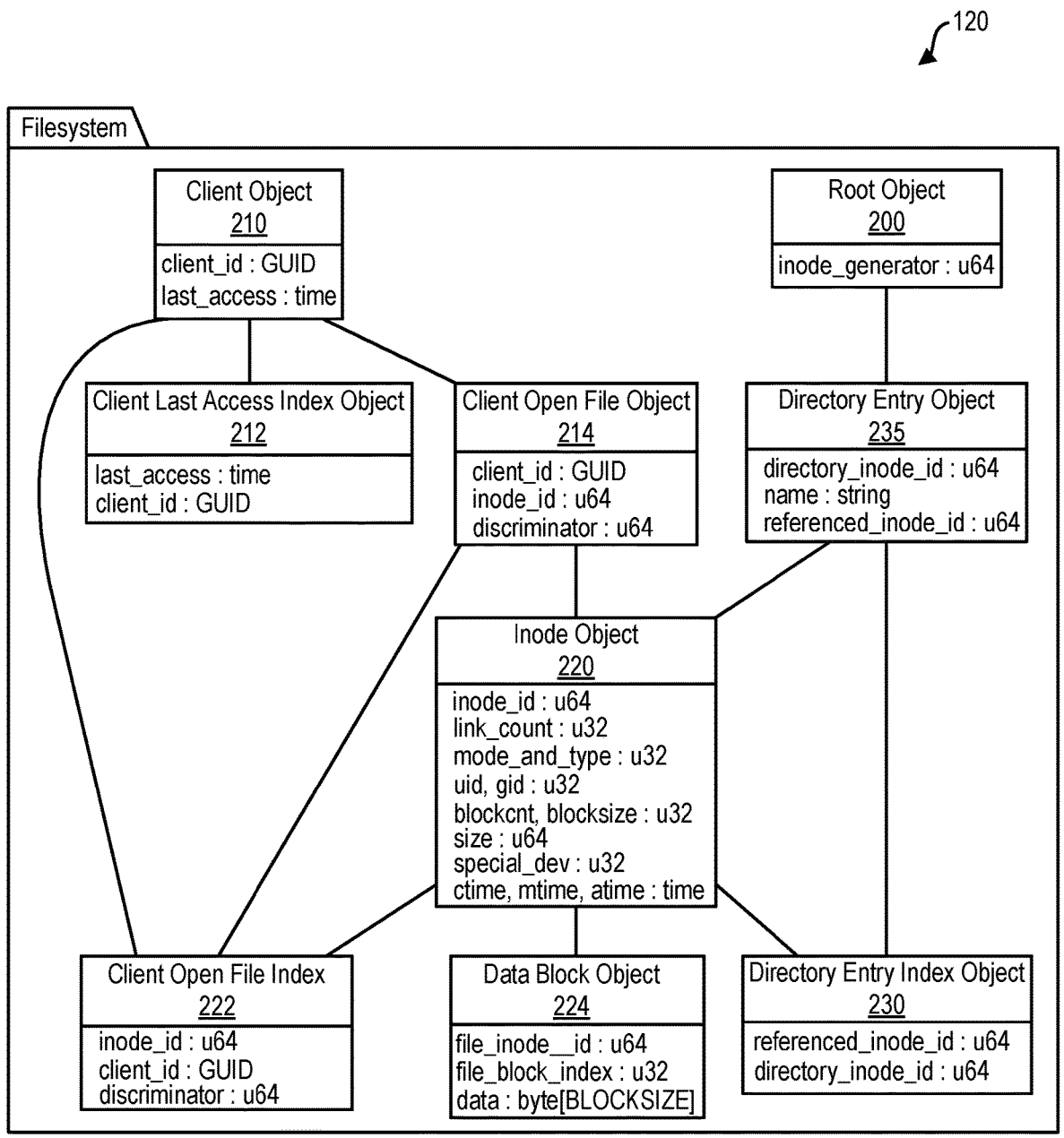
FIG. 2A depicts a shared filesystem consistent with some implementations of the current subject matter.

To further illustrate, FIG. 2A depicts the shared filesystem 120 consistent with some implementations of the current subject matter. Referring to FIGS. 1-2A, the shared filesystem 120 can include a plurality of objects. For example, as shown in FIG. 2A, the plurality of objects can include a root object 200, a client object 210, a client last access index object 212, a client open file object 214, an inode object 220, a client open file index 222, a data block object 224, a directory entry index object 230, and/or a directory entry object 235. Each of the root object 200, the client object 210, the client last access index object 212, the client open file object 214, the inode object 220, the client open file index 222, the data block object 224, the directory entry index object 230, and/or the directory entry object 235 can be configured to store data and/or metadata. In some implementations of the current subject matter, the first shared filesystem controller 130A and/or the second shared filesystem controller 130B can track and/or control access to one or more partitions of the shared filesystem 120 stored at the first computing node 110A and/or the second computing node 110B based at least on the plurality of objects. Tracking and/or controlling access to the shared filesystem 120 can require updating and/or removing at least some of the plurality of objects. As such, the shared filesystem 120 can include a garbage collector 150 configured to remove one or more of the client object 210, the client last access index object 212, the client open file object 214, the inode object 220, the client open file index 222, the data block object 224, the directory entry index object 230, and/or the directory entry object 235.

Referring again to FIGS. 1 and 2A, in some implementations of the current subject matter, the shared filesystem controller can generate the client object 210 when the client 160 is connected to the shared filesystem 120, for example, in order to access one or more common files included in the shared filesystem 120. Meanwhile, the client object 210 can be removed from the shared filesystem 120, for example, by the garbage collector 150, upon closure of the connection between the client 160 and the shared filesystem 120 and/or after a timeout. As noted, one or more partitions of the shared filesystem 120 can be stored across the distributed data storage system 100, for example, at the first computing node 110A and/or the second computing node 110B. Accordingly, the first shared filesystem controller 130A and/or the second shared filesystem controller 130B can route, to first computing node 110A and/or the second computing node 110B, requests from the client 160 to access the shared filesystem 120 such that the client 160 accesses the one or more partitions of the shared filesystem 120 stored on the first computing node 110A and/or the second computing node 110B.

In some implementations of the current subject matter, the client object 210 can be associated with a globally unique identifier (GUID). The globally unique identifier can be part of the metadata stored in the client object 210. As shown in FIG. 2A, the client object 210 can be linked to the client last access index object 212, which can be configured to store a time when the client 160 last accessed the shared filesystem 120. The client last access index object 212 can be updated, for example, by the client 160, in order to avoid a timeout of the connection between the client 160 and the shared filesystem 120. For example, according to some implementations of the current subject matter, the client last access index object 212 can be removed, for example, by the garbage collector 150, and replaced whenever the client 160 updates the time when the client 160 last accessed the shared filesystem 120. The garbage collector 150 can further remove the client object 210 and/or the client last access index object 212 when the client last access index object 212 indicates that a timeout of the connection between the client object 210 and the shared filesystem 120.

In some implementations of the current subject matter, each file in the shared filesystem 120 can be represented by an inode object such as, for example, the inode object 220. The inode object 220 can store, for example, metadata associated with the corresponding file. Furthermore, the inode object 220 can be linked to the data block object 224, which can contain the actual data of the file corresponding to the inode object 220. Although only a single data block object is shown in FIG. 2A (e.g., the data block object 224), it should be appreciated that the inode object 220 can be linked to multiple data block objects, differentiated and ordered by file_block_index.

In some implementations of the current subject matter, the client open file object 214 and the client open file index 222 linking to the inode object 220 can be created when the client 160 requests to open a file corresponding to the inode object 220. The client open file index 222 can indicate the clients accessing the file corresponding to the inode object 220 by being linked to the corresponding client objects and open file objects. For instance, as shown in FIG. 2A, the client open file index 222 can be linked to the client object 210 and the client open file object 214 to at least indicate that the client 160 is accessing the file corresponding to the inode object 220. Meanwhile, the data block object 224 can correspond to at least one of the data blocks storing the file corresponding to the inode object 220. As used herein, a data block can refer a sequence of bytes for storing data such as, for example, part of the file corresponding to the inode object 220. It should be appreciated that the first shared filesystem controller 130A and/or the second shared filesystem controller 130B can generate the inode object 220 and/or the data block object 224 upon creation of the corresponding file. Alternatively and/or additionally, the inode object 220 and/or the data block object 224 can be removed from the shared filesystem 120, for example, by the garbage collector 150, upon deletion of the corresponding file.

In some implementations of the current subject matter, the inode object 220 can be linked to another inode object corresponding to a directory as well as the directory entry object 235 to indicate that the file corresponding to the inode object 220 is part of the directory. The directory entry object 235 can be further linked to the root object 200 corresponding to a root directory of the shared filesystem 120. The directory entry object 235 can be removed from the shared filesystem 120 when the file corresponding to the inode object 220 is deleted from the shared filesystem 120. For instance, the directory entry object can be removed by deleting the directory entry object 235 by name in the directory to which the directory entry object 235 belongs. Alternatively and/or additionally, the directory entry index object 230 can also be removed from the shared filesystem 120 immediately, for example, by the first shared filesystem controller 130A and/or the second shared filesystem controller 130B, upon the deletion of the corresponding directory entry object 235.

In some implementations of the current subject matter, the shared filesystem controller can generate the client open file object 214 in response to the client 160 opening the file corresponding to the inode object 220. The client open file object 214 can be linked to the inode object 220 in order to indicate that the file corresponding to the inode object 220 is being accessed by the client 160 corresponding to the client object 210. Furthermore, the client open file object 214 can be removed from the shared filesystem 120, for example, by the garbage collector 150, when the client 160 closes the file corresponding to the inode object 220. Alternatively and/or additionally, the open file object 214 and/or the inode object 220 can be linked to the client open file index 222. For instance, FIG. 2A shows the client open file index 222 being linked to the client object 210 and the client open file object 214, which can indicate that the client 160 is accessing the file corresponding to the inode object 220.

It should be appreciated that the first shared filesystem controller 130A and/or the second shared filesystem controller 130B can prevent the deletion of the file corresponding to the inode object 220 if the client open file index 222 indicate the file as still being accessed by one or more clients such as, for example, the client 160.

Figure 2B:
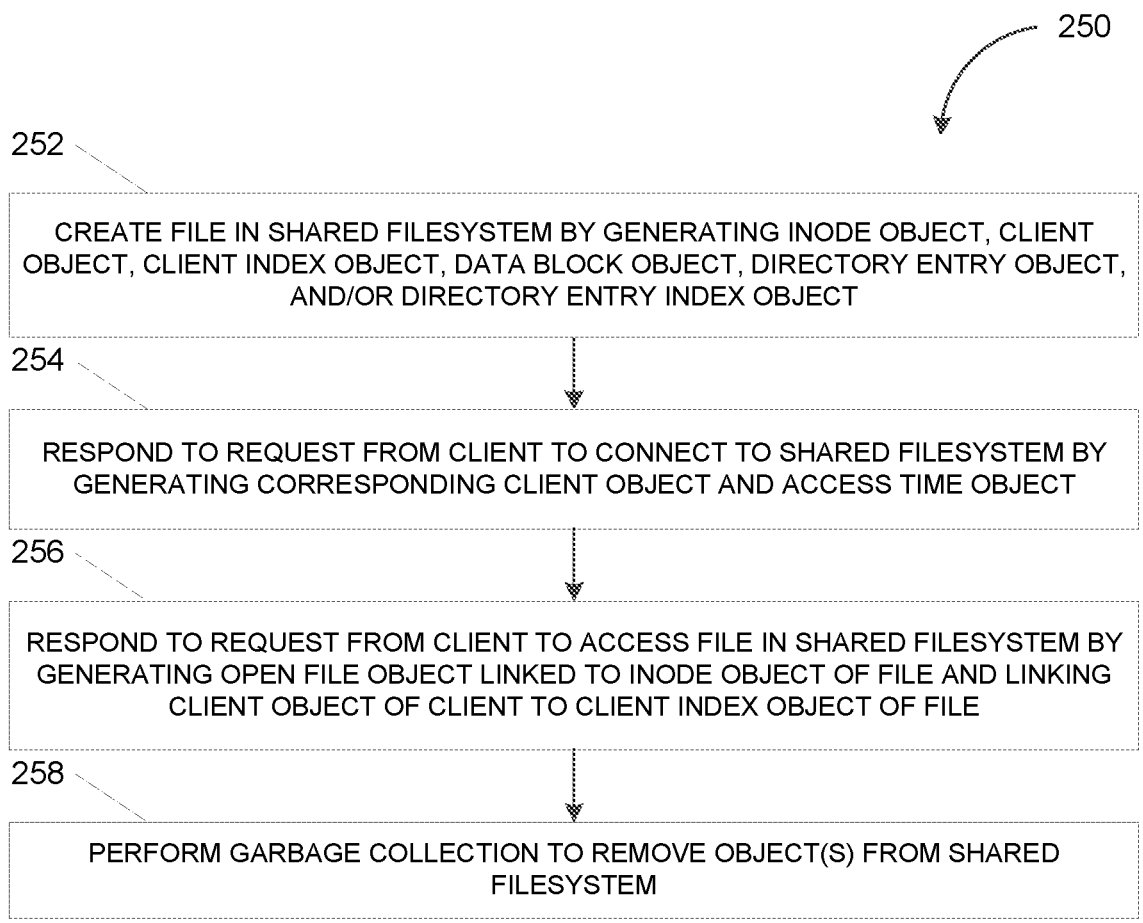
FIG. 2B depicts a flowchart illustrating a process for accessing a shared filesystem consistent with some implementations of the current subject matter.

FIG. 2B depicts a flowchart illustrating a process 250 for accessing the shared filesystem 120 consistent with some implementations of the current subject matter. Referring to FIGS. 1 and 2A-B, the process 250 can be performed by a shared filesystem controller such as, for example, the first shared filesystem controller 130A and/or the second shared filesystem controller 130B, for example, to control access to the files included in the shared filesystem 120. As noted, one or more partitions of the shared filesystem 120 can be stored across the distributed data storage system 100, for example, at the first computing node 110A and/or the second computing node 110B. Accordingly, the first shared filesystem controller 130A and/or the second shared filesystem controller 130B can respond to requests from the client 160 to access the shared filesystem 120 by at least routing the requests to the first computing node 110A and/or the second computing node 110B. In some implementations of the current subject matter, the first shared filesystem controller 130A and/or the second shared filesystem controller 130B can track and/or control access the shared filesystem 120, for example, by the client 160, based at least on a plurality of objects including, for example, the root object 200, the client object 210, the client last access index object 212, the client open file object 214, the inode object 220, the client open file index 222, the data block object 224, the directory entry index object 230, and/or the directory entry object 235.

The shared filesystem controller can create a file in the shared filesystem 120 by at least generating an inode object, an open file object, a client index object, a data block object, a directory entry object, and/or a directory entry index object (252). For example, in some implementations of the current subject matter, the shared filesystem controller can create a file in the shared filesystem 120 by generating the inode object 220 corresponding to the file and the data block object 224 corresponding to the data block storing the file. The shared filesystem controller can generate the client open file object 214 and the client open file index 222, which can indicate the client accessing the file corresponding to the inode object 220. Alternatively and/or additionally, the shared filesystem controller can generate the directory entry object 235, which can be linked to the directory entry index object 230 to at least indicate that the file corresponding to the inode object 220 is part of the directory corresponding to another inode object in the shared filesystem 120. The inode object corresponding to the directory can be linked to the client open file object 214 by a directory inode identifier (e.g., directory_inode_id) stored as part of the directory entry object 235.

The shared filesystem controller can respond to a request from the client 160 to connect to the shared filesystem 120 by at least generating a corresponding client object and access time object (254). For instance, the shared filesystem controller can respond to a request from the client 160 to connect to the shared filesystem 120 by generating the client object 210 and the client last access index object 212. The client last access index object 212 can store a time when the client 160 last accessed the shared filesystem 120. In some implementations of the current subject matter, the client last access index object 212 can store a time when the client 160 last accessed the shared filesystem 120. The client last access index object 212 can be updated, for example, by the client 160, in order to avoid a timeout of the connection between the client 160 and the shared filesystem 120.

The shared filesystem controller can respond to a request from the client 160 to access a file in the shared filesystem 120 by at least generating an open file object linked to an inode object of the file and linking a client object of the client 160 to the client index object of the file (256). For example, the client 160 can request to access one or more files in the shared filesystem 120 including, for example, the file corresponding to the inode object 220. In some implementations of the current subject matter, the shared filesystem controller can respond to the request by generating the client open file object 214, which can be linked to the inode object 220. Furthermore, the shared filesystem controller can link the client object 210 corresponding to the client 160 to the client open file index 222 associated with the inode object 220. The link between the client object 210 and the client open file index 222 can indicate that the client 160 is one of the clients accessing the file corresponding to the inode object 220.

The shared filesystem controller can perform garbage collection to remove one or more objects from the shared filesystem 120 (258). For instance, in some implementations of the current subject matter, the shared filesystem controller, for example, the garbage collector 150, can remove the client object 120, the client last access index object 212, and/or the client open file object 214 when the connection between the client 160 and the shared filesystem 120 closes and/or times out. The client open file object 214 and client open file index object 222 can also be removed when the client 160 closes the file corresponding to the inode object 220. Alternatively and/or additionally, the shared filesystem controller, for example, the garbage collector 150, can remove the inode object 220, the data block object 224, the directory entry object 235, and/or the corresponding directory entry index object 230 when the file corresponding to the inode object 220 is deleted from the shared filesystem 120. The directory entry index object 230 can be removed from the shared filesystem 120 upon deletion of the corresponding directory form the shared filesystem 120.

Figure 3A:
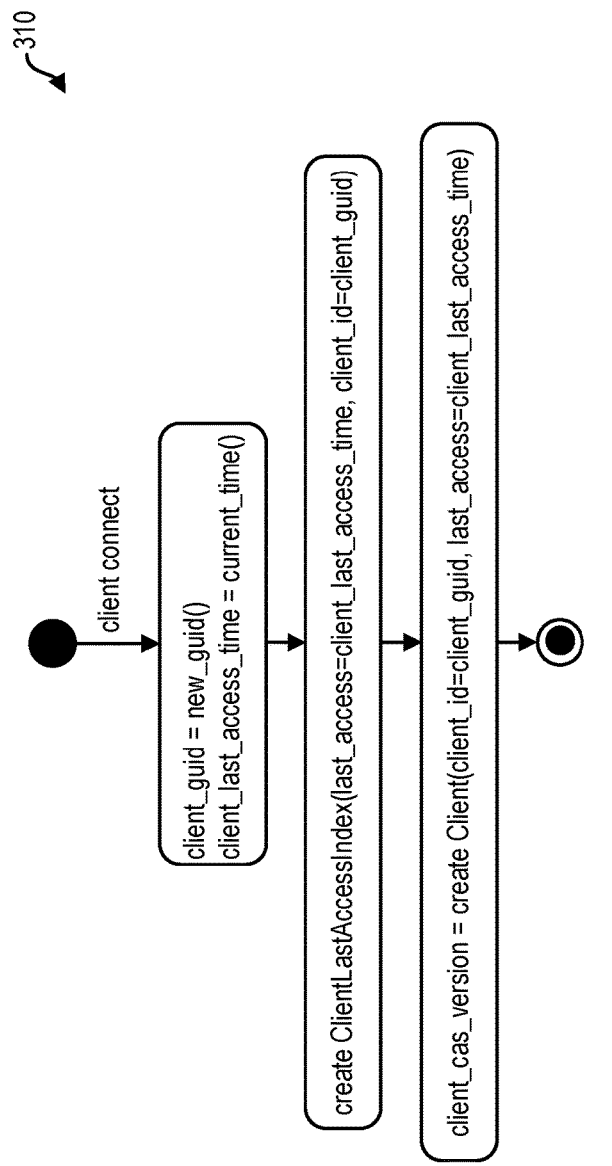
FIG. 3A depicts a flowchart illustrating a process for establishing a connection to a shared filesystem consistent with some implementations of the current subject matter.

FIG. 3A depicts a flowchart illustrating a process 310 for establishing a connection to the shared filesystem 120 consistent with some implementations of the current subject matter. Referring to FIGS. 1, 2A, and 3A, the process 310 can be performed by a shared filesystem controller such as, for example, the first shared filesystem controller 130A and/or the second shared filesystem controller 130B. For example, in some implementations of the current subject matter, the first shared filesystem controller 130A and/or the second shared filesystem controller 130B can perform the process 310 in response to a request to establish a connection between the client 160 and the shared filesystem 120.

As shown in FIG. 3A, the shared filesystem controller can respond to a request to establish a connection between the client 160 and the shared filesystem 120 by generating a globally unique identifier (GUID) for the client 160. The shared filesystem controller can further determine that a time when the client 160 last accessed the shared filesystem 120 is the current time. In some implementations of the current subject matter, the shared filesystem controller can generate the client last access index object 212, which can store the time when the client 160 last accessed the shared filesystem 120. Alternatively and/or additionally, the shared filesystem controller can generate the client object 210, which store the globally unique identifier of the client 160 and the time when the client 160 last accessed the shared filesystem 120.

Figure 3B:
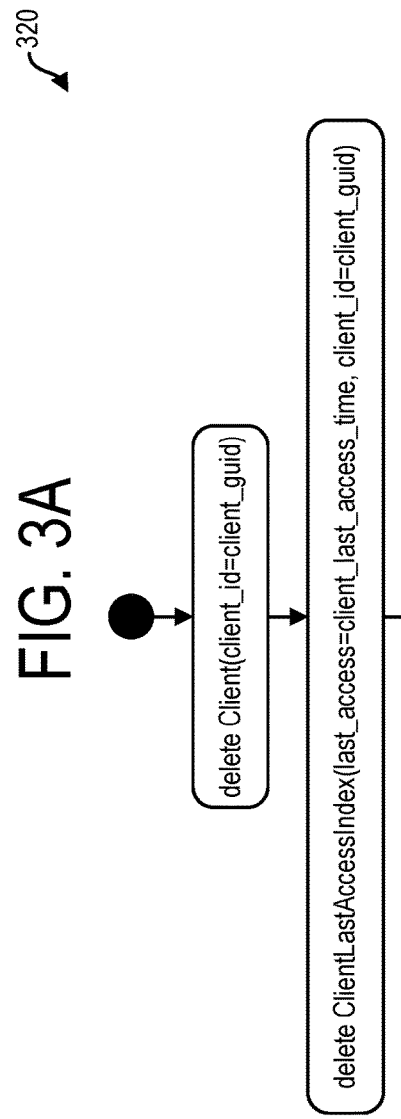
FIG. 3B depicts a flowchart illustrating a process for closing a connection to a shared filesystem consistent with some implementations of the current subject matter.

FIG. 3B depicts a flowchart illustrating a process 320 for terminating a connection to the shared filesystem 120 consistent with some implementations of the current subject matter. Referring to FIGS. 1, 2A, and 3B, the process 320 can be performed by a shared filesystem controller such as, for example, the first shared filesystem controller 130A and/or the second shared filesystem controller 130B. For example, in some implementations of the current subject matter, the first shared filesystem controller 130A and/or the second shared filesystem controller 130B can perform the process 320 in response to a request to close a connection between the client 160 and the shared filesystem 120.

As shown in FIG. 3B, the shared filesystem controller can respond to a request to close a connection between the client 160 and the shared filesystem 120 by removing the client object 210 and the client last access index object 212. It should be appreciated the client last access index object 212 can be removed after the client object 210 has been removed from the shared filesystem 120. Removing the client last access index object 212 prior to the removal of the client object 210 can prevent the garbage collector 150 from identifying the client object 210 as being associated with a closed connection and removing the client object 210. Failure to remove such dangling objects, which are no longer referenced in any way, can result in a leakage of resources.

Figure 3C:
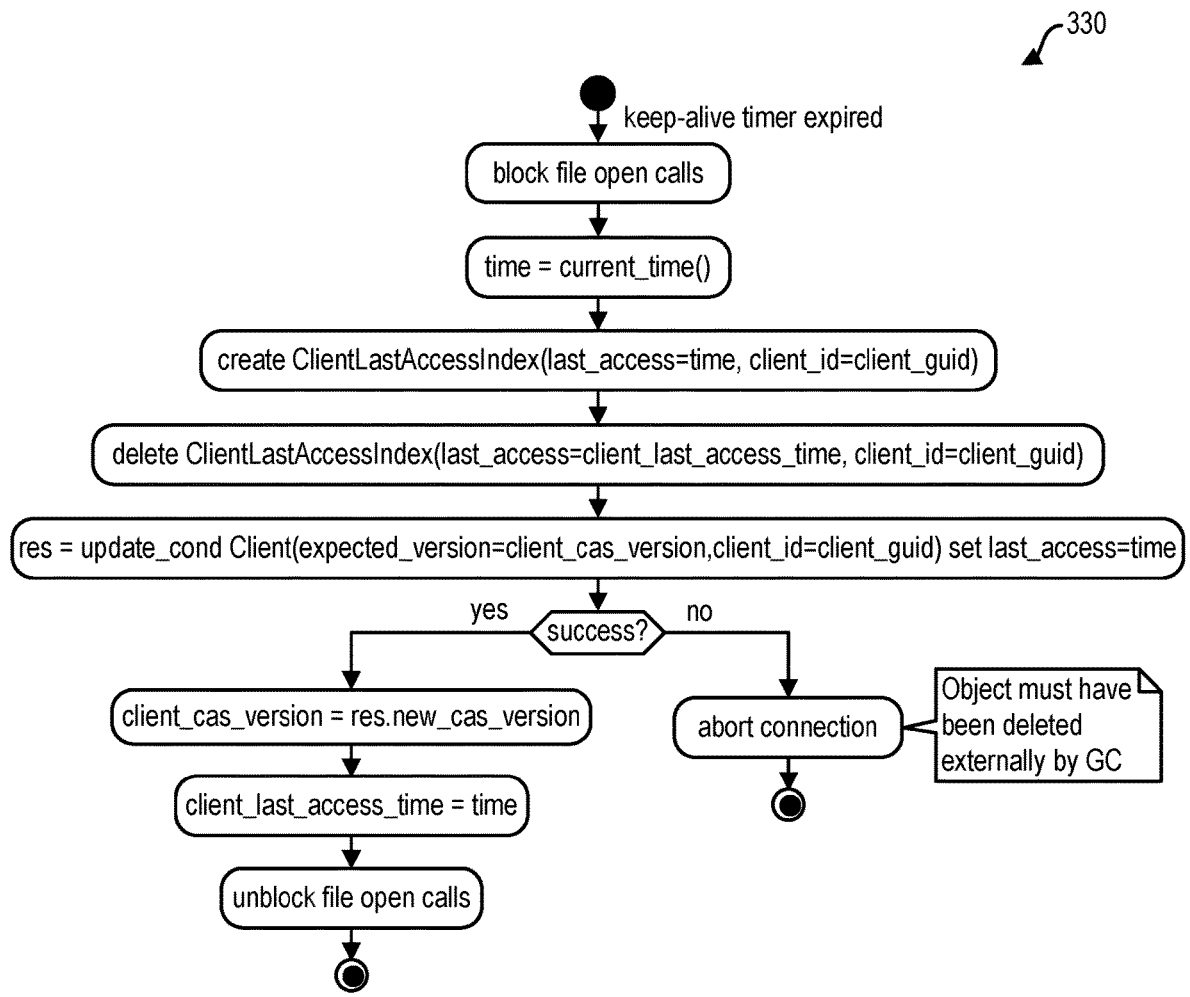
FIG. 3C depicts a flowchart illustrating a process for maintaining a connection to a shared filesystem consistent with some implementations of the current subject matter.

FIG. 3C depicts a flowchart illustrating a process 330 for preserving a connection to the shared filesystem 120 consistent with some implementations of the current subject matter. Referring to FIGS. 1, 2A, and 3B, the process 330 can be performed by a shared filesystem controller such as, for example, the first shared filesystem controller 130A and/or the second shared filesystem controller 130B. For example, in some implementations of the current subject matter, the first shared filesystem controller 130A and/or the second shared filesystem controller 130B can perform the process 330 in order to preserve a connection between the client 160 and the shared filesystem 120, for example, by at least preventing a timeout of the connection between the client 160 and the shared filesystem 120.

In some implementations of the current subject matter, the client 160 can periodically update the last access time associated with the client 160 in order to prevent the connection between the client 160 and the shared filesystem 120 from timing out. Referring to FIG. 3C, the shared filesystem controller can respond to a request to update last access time by replacing the client last access index object 212. For example, the shared filesystem controller can delete the existing client last access index object 212, which stores the last time the client 160 accessed the shared filesystem 120. Furthermore, the shared filesystem controller can generate a new client last access index object 212, which stores the current time as the last time the client 160 accessed the shared filesystem 120. It should be appreciated that the shared filesystem controller can prevent the client 160 from opening files in the shared filesystem 120 while the client last access index object 212 is being updated because the connection between the client 160 and the shared filesystem 120 can timeout and the client object 210 removed, for example, by the garbage collector 150, before the client last access index object 212 can be successfully updated.

Figure 3D:
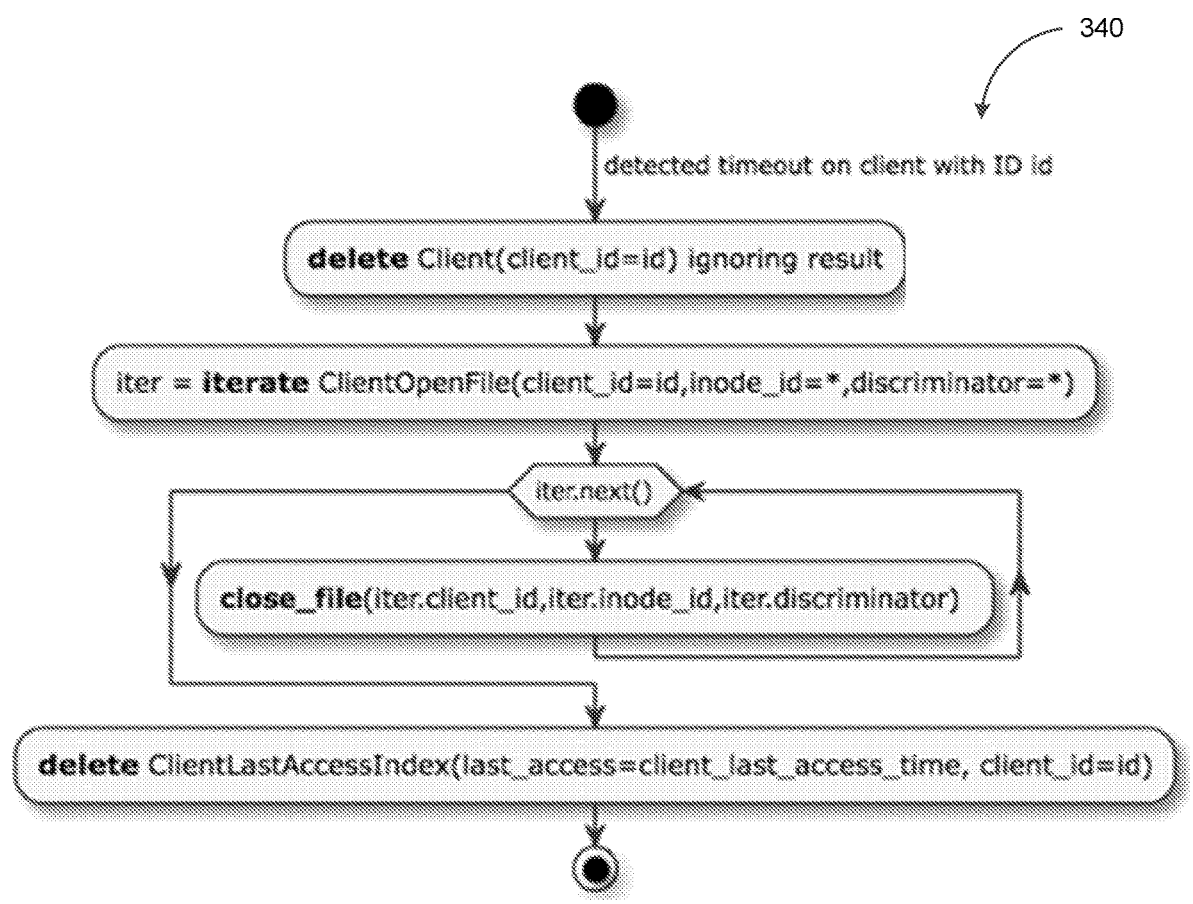
FIG. 3D depicts a flowchart illustrating a process for timing out a connection to a shared filesystem consistent with some implementations of the current subject matter.

FIG. 3D depicts a flowchart illustrating a process 340 for timing out a connection to the shared filesystem 120 consistent with some implementations of the current subject matter. Referring to FIGS. 1, 2A, and 3D, the process 340 can be performed by the shared filesystem controller such as, for example, the first shared filesystem controller 130A and/or the second shared filesystem controller 130B. For example, in some implementations of the current subject matter, the first shared filesystem controller 130A and/or the second shared filesystem controller 130B can perform the process 340 upon detecting a timeout of a connection between the client 160 and the shared filesystem 120.

As shown in FIG. 3D, the shared filesystem controller can respond to the timeout of a connection between the client 160 and the shared filesystem 120 by deleting the client object 210. The shared filesystem controller can further close all of the open files associated with the client 160 by at least iterating through the open file objects linked to the client object 210 and close the corresponding files. For instance, referring to FIG. 2A, the shared filesystem controller can close the file associated with the client open file object 214. Upon closing all of the open files associated with the client 160, the shared filesystem controller can delete the client last access index object 212.

Figure 3E:
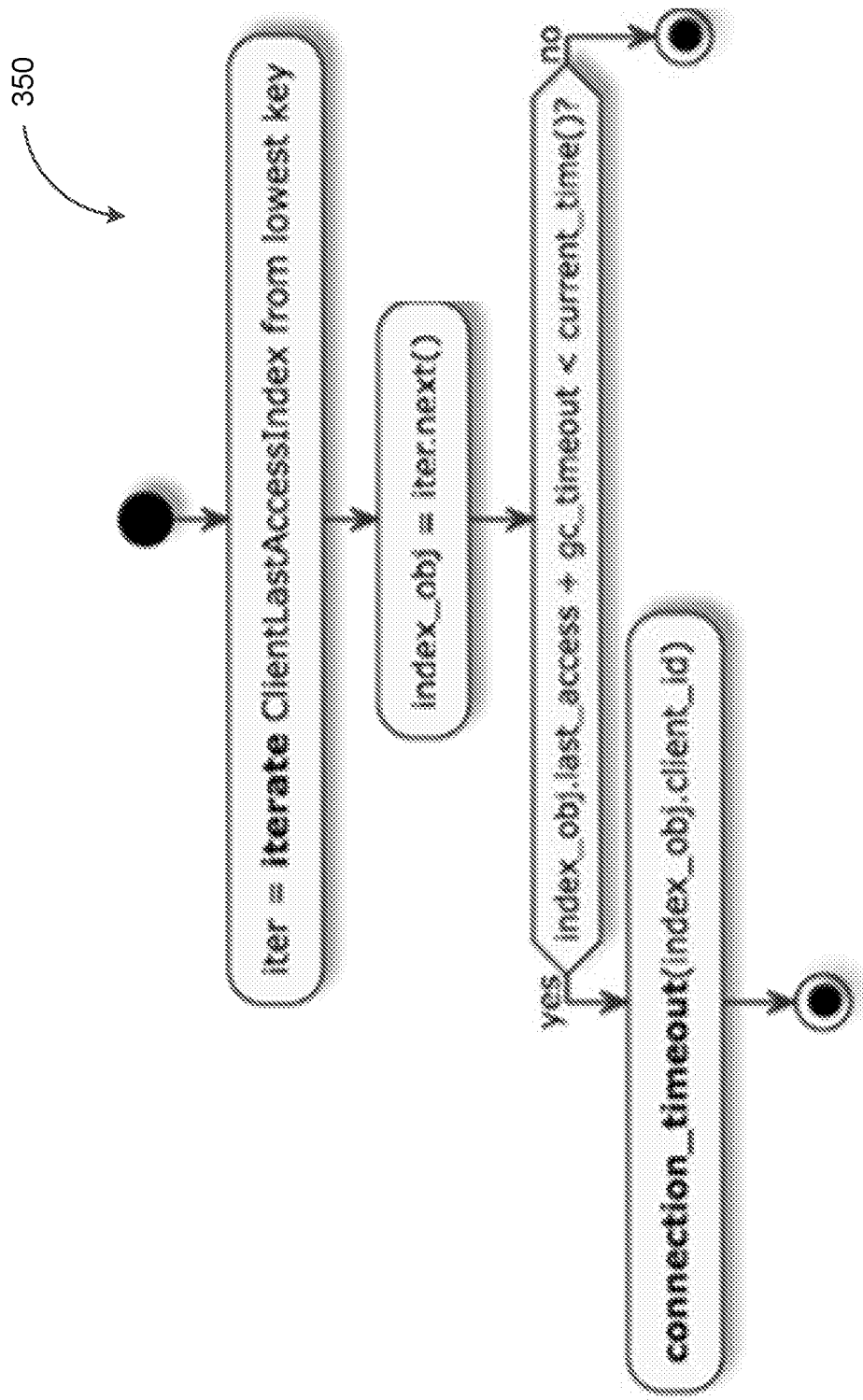
FIG. 3E depicts a flowchart illustrating a process for detecting timed out connections with a shared filesystem consistent with some implementations of the current subject matter.

FIG. 3E depicts a flowchart illustrating a process 350 for detecting timed out connections with the shared filesystem 120 consistent with some implementations of the current subject matter. Referring to FIGS. 1, 2A, and 3E, the process 350 can be performed by the shared filesystem controller such as, for example, the first shared filesystem controller 130A and/or the second shared filesystem controller 130B. For example, the first shared filesystem controller 130A and/or the second shared filesystem controller 130B can perform the process 350 in order to detect when the connection between the client 160 and the shared filesystem 120 times out.

As shown in FIG. 3E, the shared filesystem controller can iterate through the access time objects of the clients connected to the shared filesystem 120 including, for example, the client last access index object 212 associated with the client object 210 of the client 160. A connection between the shared filesystem 120 and a client can be timed out if the difference between the last access time stored in that client's access time object and the current time exceeds a threshold value (e.g., gc_timeout). For example, the shared filesystem controller can determine that the connection between the client 160 and the shared filesystem 120 has timed out if a difference between the current time and the last access time stored in the client last access index object 212 exceeds a threshold value. As noted, the shared filesystem controller can delete, from the shared filesystem 120, the client object 210 and the client last access index object 212 associated with the client 160 upon determining that the connection between the client 160 and the shared filesystem 120 has timed out. Furthermore, the shared filesystem controller can close the files opened by the client 160. For instance, the shared filesystem controller can close, based at least on the client open file object 214 associated with the client object 210, the file corresponding to the inode object 220.

Figure 4A:
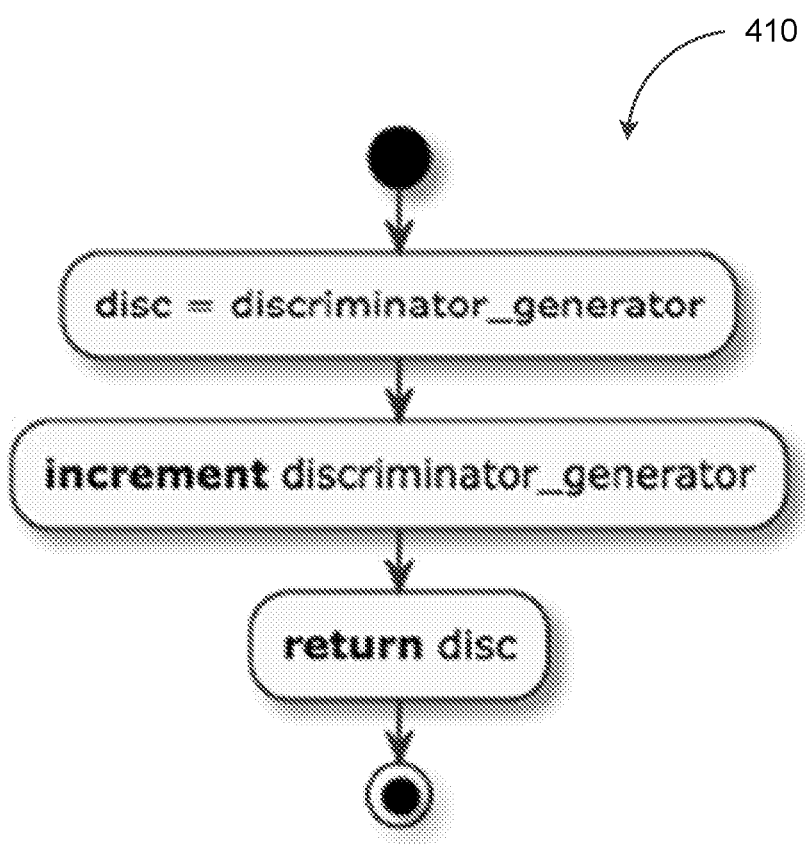
FIG. 4A depicts a flowchart illustrating a process for generating a discriminator for a file in a shared filesystem consistent with some implementations of the current subject matter.

FIG. 4A depicts a flowchart illustrating a process 410 for generating a discriminator for a file in the shared filesystem 120 consistent with some implementations of the current subject matter. Referring to FIGS. 1, 2A, and 4A, a shared filesystem controller, for example, the first shared filesystem controller 130A and/or the second shared filesystem controller 130B, can perform the process 410 in order to generate a discriminator each time the client 160 opens the same file such as, for example, the file corresponding to the inode object 220.

In some implementations of the current subject matter, each open file can be associated with a key to enable a differentiation between different open files. However, a key formed from a client identifier and an inode identifier are insufficient to differentiate between open files associated with the client 160 if the client 160 opens the same file multiple times. As such, according to some implementations of the current subject matter, the key associated with an open file can be formed based on a client identifier, an inode identifier, and a discriminator value. The discriminator value can be generated, for example, by a counter associated with the client 160. It should be appreciated that including a discriminator value in the keys associated with open files and can enable a differentiation between open files associated with the client 160 even when the client 160 opens the same file multiple times. For instance, as shown in FIG. 4A, in response to the client 160 opening a file such as, for example, the file corresponding to the inode object 220, the counter associated with the client 160 can be incremented in order to generate a discriminator value, which can be used for form a key associated with the open file. As shown in FIG. 2A, the discriminator value can be stored as part of the client open file object 214 linked with the client object 210 and the inode object 220.

Figure 4B:
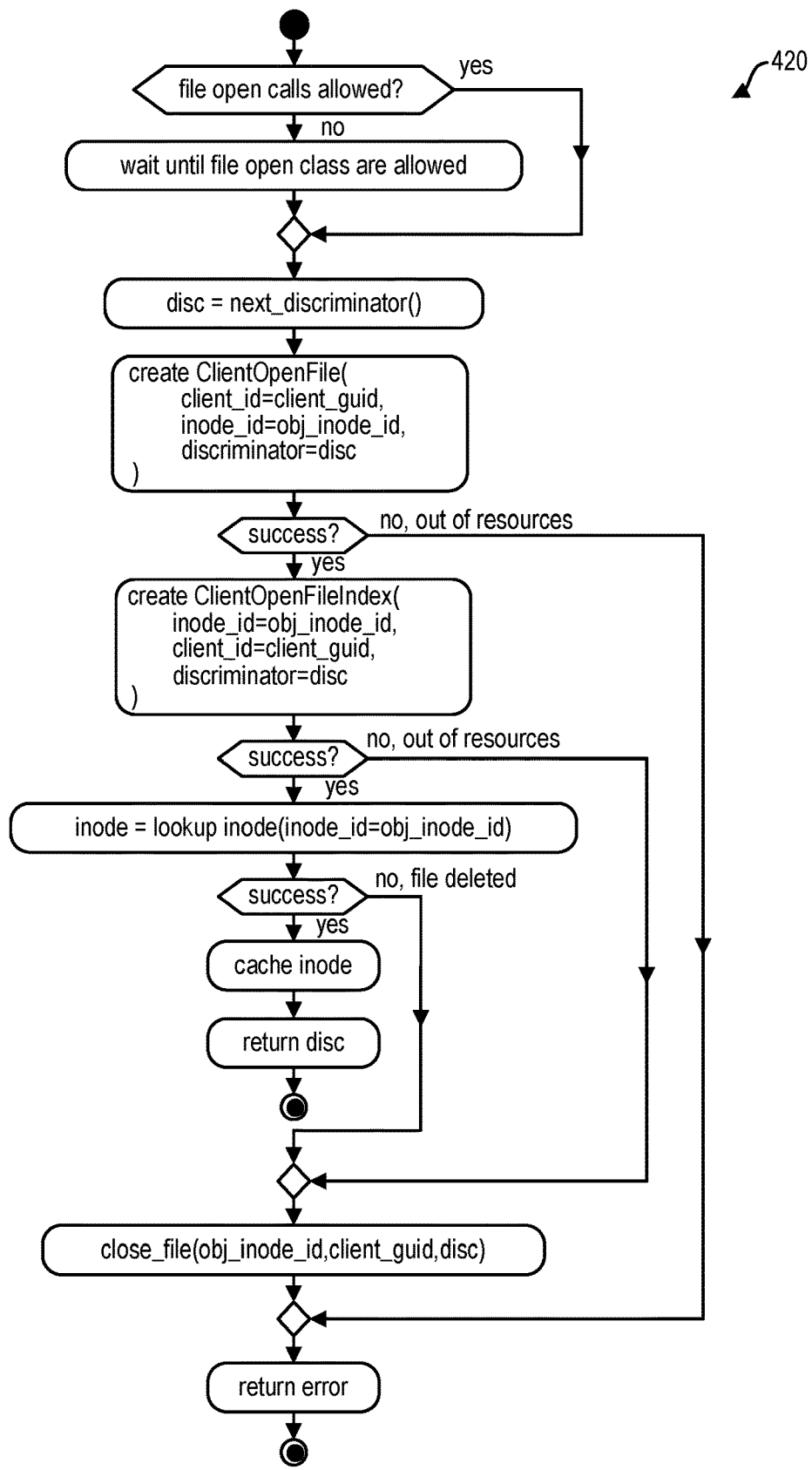
FIG. 4B depicts a flowchart illustrating a process for opening a file and/or a directory in a shared filesystem consistent with some implementations of the current subject matter.

FIG. 4B depicts a flowchart illustrating a process 420 for opening a file and/or a directory in the shared filesystem 120 consistent with some implementations of the current subject matter. Referring to FIGS. 1, 2A, and 4B, a shared filesystem controller, for example, the first shared filesystem controller 130A and/or the second shared filesystem controller 130B, can perform the process 420 in order to open a file in the shared filesystem 120 such as, for example, the file corresponding to the inode object 220. Alternatively and/or additionally, the shared filesystem controller can perform the process 420 in order to open a directory in the shared filesystem 120 such as, for example, a directory corresponding to another inode object in the shared filesystem 120 linked with the directory entry index object 230.

For example, the client 160 can request to open the file corresponding to the inode object 220 and/or a directory corresponding to another inode object. In some implementations of the current subject matter, the shared filesystem controller can respond to the request by creating the client open file object 214, which can be linked to the client object 210 associated with the client 160 and the inode object 220 corresponding to the file and/or another inode object corresponding to the directory. The shared filesystem controller can further generate the client open file index 222, which can be linked to the client object 210, the inode object 220 corresponding to the file, and/or another inode object corresponding to the directory to at least indicate that the file and/or the directory are being accessed by the client 160. According to some implementations of the current subject matter, the shared filesystem controller can locate the inode corresponding to the inode object 220 corresponding to the file and/or the other inode object corresponding to the directory. The shared filesystem controller can further cache these inode objects since the client 160 is likely to request the corresponding file and/or directory multiple times.

Figure 4C:
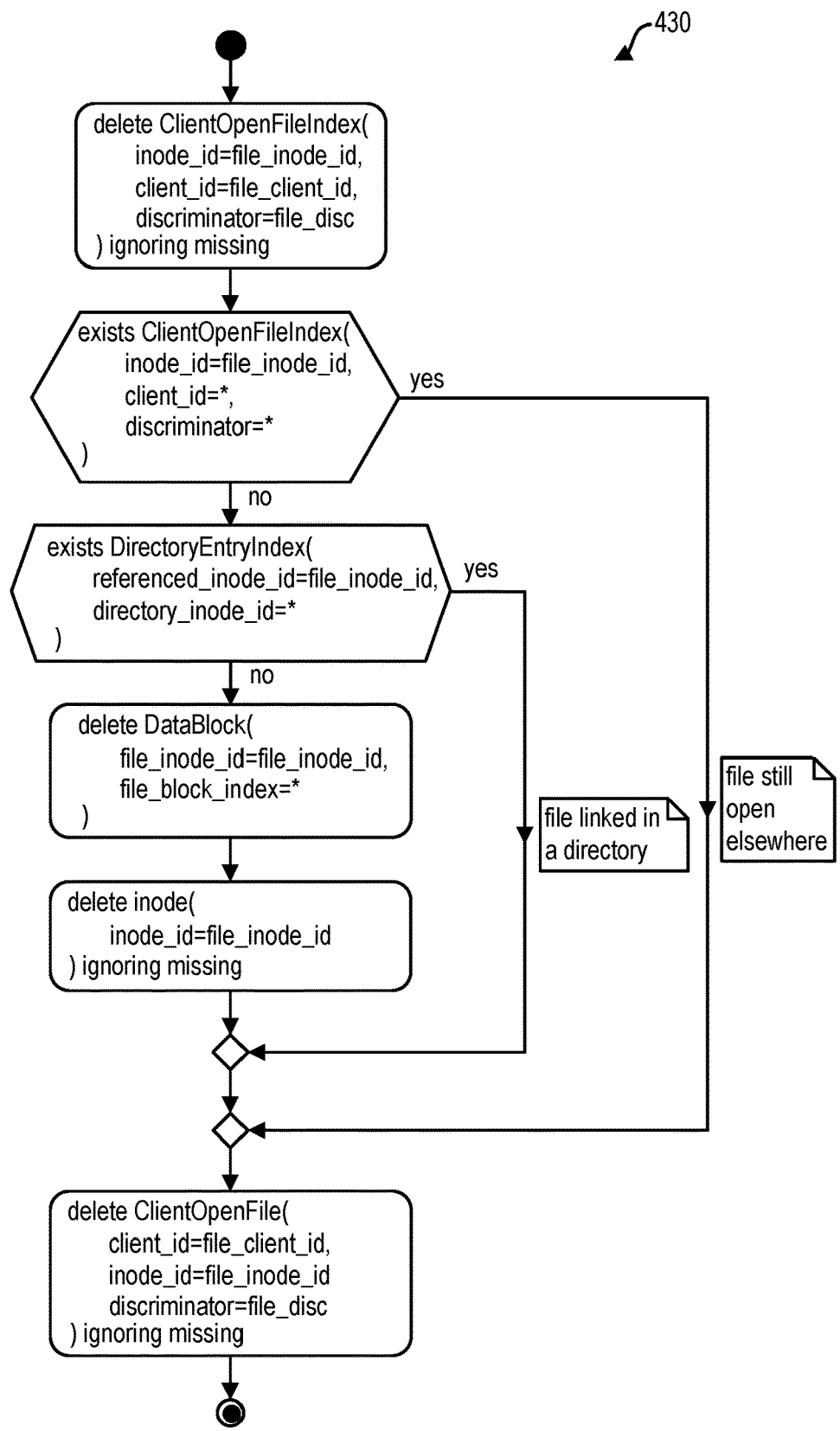
FIG. 4C depicts a flowchart illustrating a process for closing a file and/or a directory in a shared filesystem consistent with some implementations of the current subject matter.

FIG. 4C depicts a flowchart illustrating a process 430 for closing a file and/or a directory in the shared filesystem 120 consistent with some implementations of the current subject matter. Referring to FIGS. 1, 2A, and 4C, a shared filesystem controller, for example, the first shared filesystem controller 130A and/or the second shared filesystem controller 130B can perform the process 430 in order to close a file and/or a directory in the shared filesystem 120 such as, for example, the file corresponding to the inode object 220. Alternatively and/or additionally, the shared filesystem controller can perform the process 430 in order to close a directory in the shared filesystem 120 such as, for example, the directory corresponding to another inode object in the shared filesystem 120 linked with the directory entry index object 230.

For example, the client 160 can request to close the file corresponding to the inode object 220 and/or the directory corresponding to another inode object. In some implementations of the current subject matter, the shared filesystem controller can respond to the request by deleting the client open file index 222, which can be linked to the client object 210 and the inode object 220 to indicate that the client 160 associated with the client object 210 is accessing the file associated with the inode object 220. According to some implementations of the current subject matter, the shared filesystem controller can delete the inode object 220 and any data block objects associated with the file (e.g., the data block object 224 and/or the like) if the inode object 220 is not associated with a directory entry object and any other client index objects. That is the shared filesystem controller can delete the file from the shared filesystem 120 if the file is not part of a directory and is not being accessed by any other clients of the shared filesystem 120. Furthermore, the shared filesystem controller can delete the client open file object 214 associated with the client object 210 and the inode object 220. As noted, the client open file object 214 can indicate that the client 160 is accessing the file corresponding to the inode object 220. Thus, the client open file object 214 can be deleted once the client 160 requests to close the file corresponding to the inode object 220.

Figure 4D:
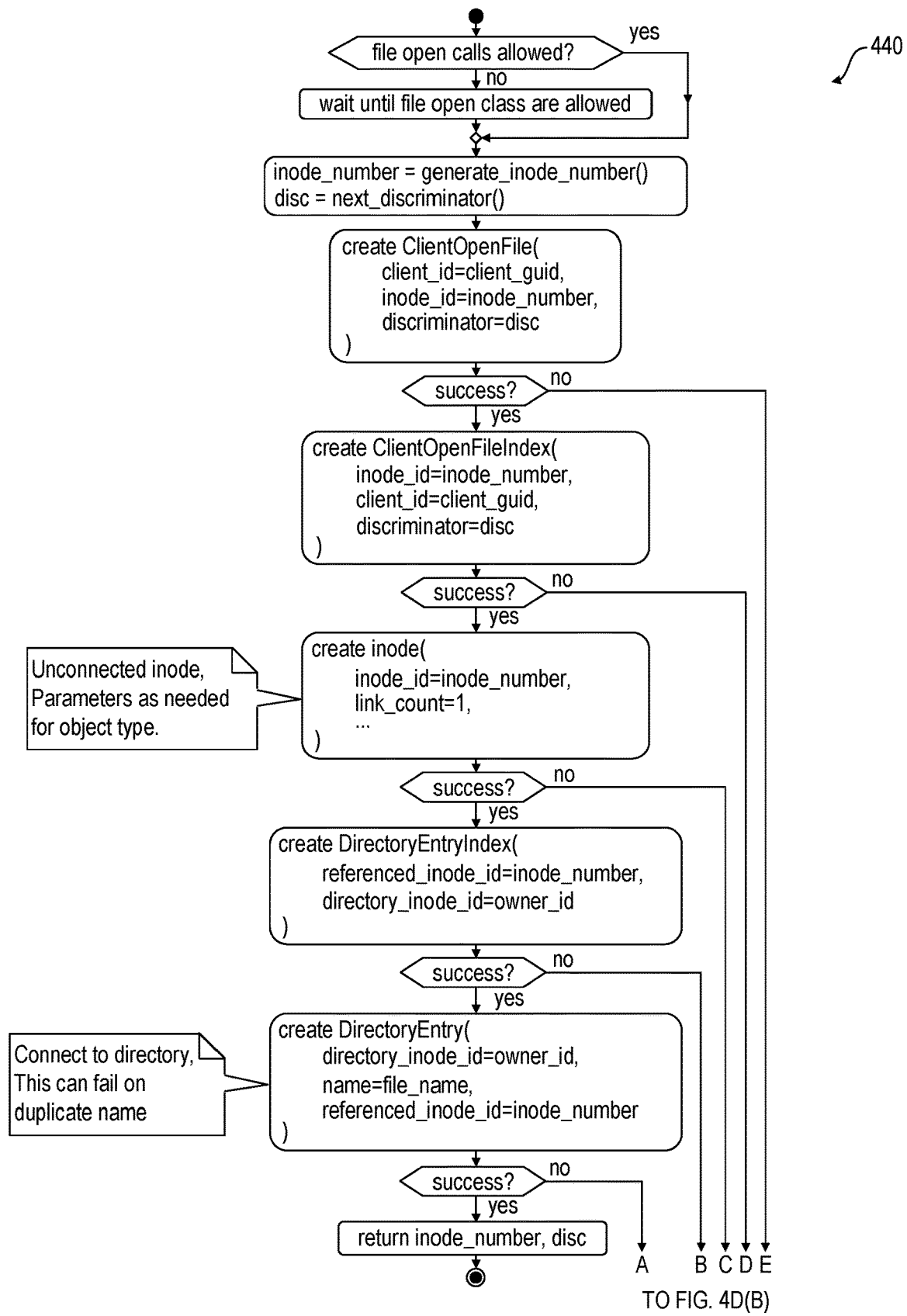
FIG. 4D depicts a flowchart illustrating a process for creating a file and/or a directory in a shared filesystem consistent with some implementations of the current subject matter.
Figure 4D:
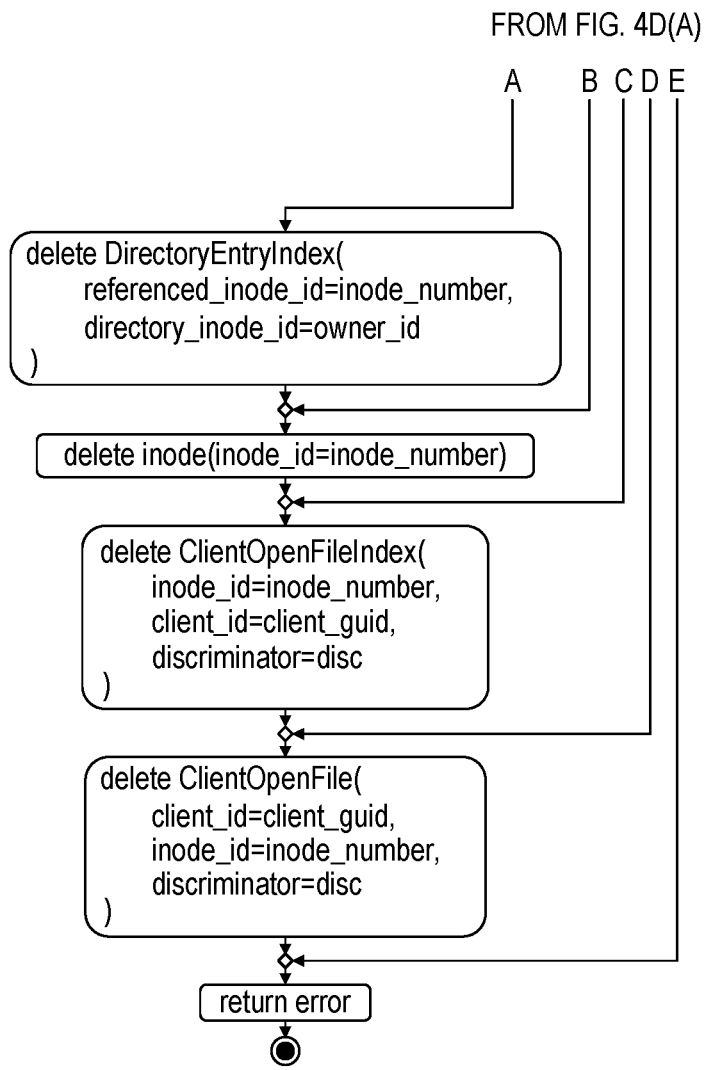

FIG. 4D depicts a flowchart illustrating a process 440 for creating a file and/or a directory in the shared filesystem 440 consistent with some implementations of the current subject matter. Referring to FIGS. 1, 2A, and 4D, a shared filesystem controller, for example, the first shared filesystem controller 130A and/or the second shared filesystem controller 130B, can perform the process 440 in order to create a file in the shared filesystem 120 such as, for example, the file corresponding to the inode object 220. Alternatively and/or additionally, the shared filesystem controller can perform the process 440 in order to create a directory in the shared filesystem 120 such as, for example, a directory corresponding to another inode object in the shared filesystem 120 linked with the directory entry index object 230.

In some implementations of the current subject matter, the shared filesystem controller can respond to a request from the client 160 to create a file and/or a directory including, for example, the file corresponding to the inode object 220 and/or the directory corresponding to the another inode object. As shown in FIG. 4D, the shared filesystem controller can respond to the request by generating an inode identifier and a discriminator value for the file and/or the directory. The shared filesystem controller can further generate the client open file object 214. According to some implementations of the current subject matter, the client open file object 214 can store the inode identifier and the discriminator value. Furthermore, the client open file object 214 can be linked to the inode object 220 corresponding to the file and/or the inode object corresponding to the directory as well as the client object 210 corresponding to the client 160. In the event the shared filesystem controller is unable to successfully generate the client open file object 214, the shared filesystem controller can return an error indication to the client 160.

In some implementations of the current subject matter, upon generating the client open file object 214, the shared filesystem controller can then generate the client open file index 222. As shown in FIG. 2A, the client open file index 222 can be linked to the client object 210 corresponding to the client 160 and the inode object 220 corresponding to the file and/or the inode object corresponding to the directory. This linkage can indicate that the client 160 is one of the clients currently accessing the file corresponding to the inode object 220 and/or the directory corresponding to the other inode object. In the event the shared filesystem controller cannot successfully generate the client open file index 222, the shared filesystem controller can delete the client open file object 214 and return an error indication to the client 160.

Referring again to FIG. 4D, if the shared filesystem controller is able to successfully generate the client open file index 222, the shared filesystem controller can subsequently generate the inode object 220 corresponding to the file and/or the inode object corresponding to the directory. As shown in FIG. 2A, the inode object 220 can be linked to the client open file object 214 and the client open file index 222 to at least indicate that the file corresponding to the inode object 220 and/or the directory corresponding to the other inode object are being accessed by the client 160. If the shared filesystem controller is unable to successfully generate the inode object 220 corresponding to the file and/or the inode object corresponding to the directory, the shared filesystem controller can delete the open file object 114 and the client open file index 222 previously generated by the shared filesystem controller. Furthermore, the shared filesystem controller can return an error indication to the client 160.

In some implementations of the current subject matter, upon successfully generating the inode object 220 corresponding to the file and/or another inode object corresponding to the directory, the shared filesystem controller can generate the directory entry index object 230 corresponding to a directory in the shared filesystem 120 that includes the file corresponding to the inode object 220. If the shared filesystem controller is unable to successfully generate the directory entry index object 230, the shared filesystem controller can delete the inode objects corresponding to the file and/or the directory, the client open file object 214, and/or the client open file index 222 previously generated by the shared filesystem controller. Furthermore, the shared filesystem controller can return an error indication to the client 160.

Alternatively and/or additionally, if the shared filesystem controller is able to successfully generate the directory entry index object 230, the shared filesystem controller can then generate the directory entry object 235. As shown in FIG. 2A, the inode object 220 can be linked to the directory entry object 235 and the directory entry index object 230 to at least indicate that the file corresponding to the inode object 220 is part of a directory having contents corresponding to the directory entry index object 230. Upon successfully generating the directory entry object 235, the shared filesystem controller can return, to the client 160, the inode identifier and the discriminator value associated with the file and stored as part of the corresponding inode object 220. In the event the shared filesystem controller is unable to successfully generate directory entry object 235, the shared filesystem controller can delete all objects previously generated by the shared file system controller including, for example, the inode object 220, the client open file object 214, the client open file index 222, and/or the directory entry index object 230. The shared filesystem controller can further return, to the client 160, an error indication.

Figure 4E:
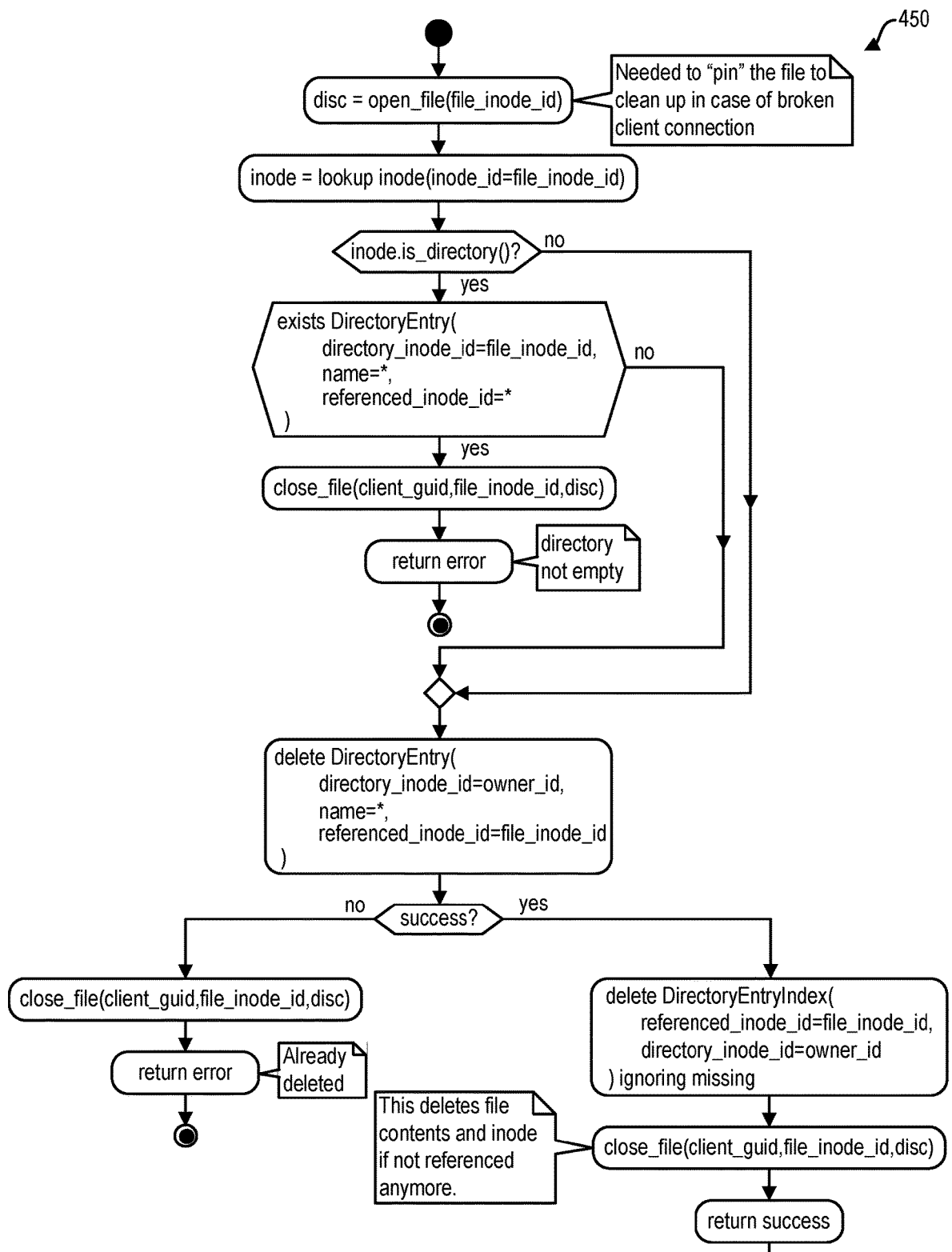
FIG. 4E depicts a flowchart illustrating a process for deleting a file and/or a directory in a shared filesystem consistent with some implementations of the current subject matter.

FIG. 4E depicts a flowchart illustrating a process 450 for deleting a file and/or a directory in the shared filesystem 450 consistent with some implementations of the current subject matter. Referring to FIGS. 1, 2A, and 4E, a shared filesystem controller, for example, the first shared filesystem controller 130A and/or the second shared filesystem controller 130B can perform the process 450 in order to delete a file in the shared filesystem 120 such as, for example, the file corresponding to the inode object 220. Alternatively and/or additionally, the shared filesystem controller can perform the process 450 in order to delete a directory in the shared filesystem 120 such as, for example, the directory corresponding to another inode object in the shared filesystem 120 linked to the directory entry index object 230.

In some implementations of the current subject matter, the shared file system controller can respond to a request from the client 160 to delete a file and/or a directory from the shared filesystem 120 including, for example, the file corresponding to the inode object 220 and/or the directory corresponding to another inode object in the shared filesystem 120. Referring to FIG. 4E, the shared filesystem controller can respond to the request by opening the file and/or the directory based at least on the inode identifier associated with the file and/or the directory. As noted, the inode object 220 corresponding to the file and/or the inode object corresponding to the directory can store the inode identifier of the file. Furthermore, the shared filesystem controller can respond to the request by unlinking the file from a directory containing the file and/or the directory from any parent directory containing the directory.

For example, as shown in FIG. 4E, the shared filesystem controller can determine whether one or more other files and/or directories are linked to a directory entry object that is being deleted such as, for example, the directory entry object 235. As noted, the link between the inode object 220 and the directory entry object 235 can indicate that the file corresponding to the inode object 220 is part of a directory. If the shared filesystem controller determines that the file is not part of a directory in the shared filesystem 120 based on the corresponding inode object 220 not being linked to the directory entry object 235, the shared filesystem controller can delete the file by closing the files and/or the directories linked to the directory entry object that is being deleted (e.g., the directory entry object 235). Alternatively and/or additionally, if the shared filesystem controller determines that file is part of a directory in the shared filesystem 120 based on the corresponding inode object 220 being linked to the directory entry object 235, the shared filesystem controller can delete the file by deleting the directory entry object 235 in addition to closing the file corresponding to the inode object 220.

Figure 4F:
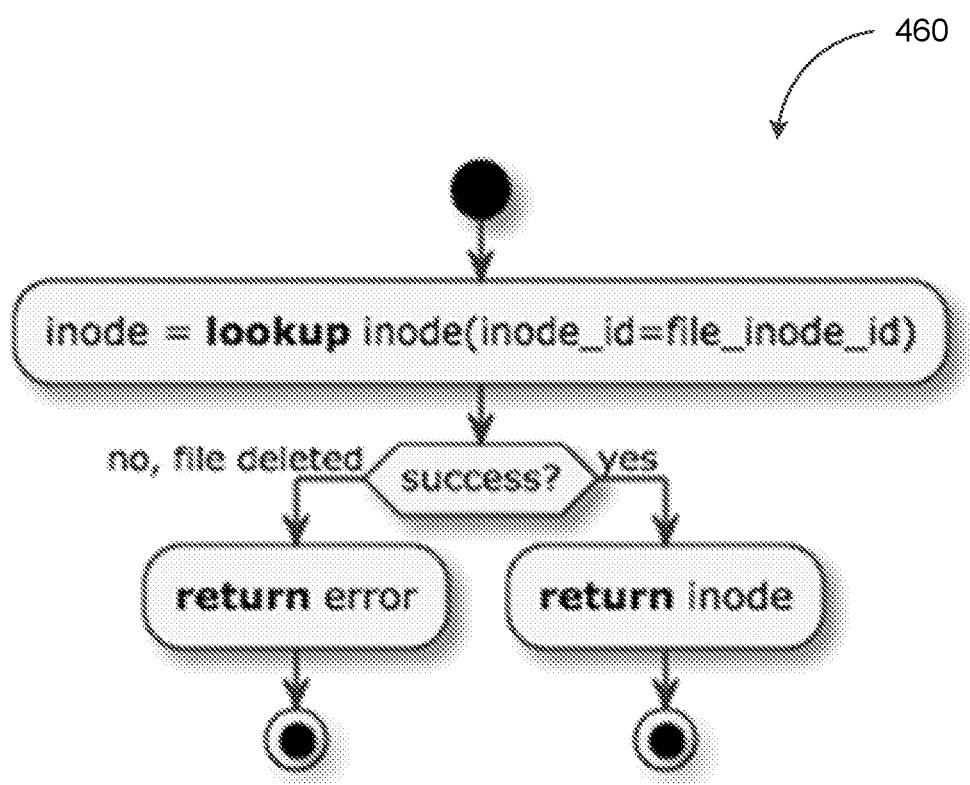
FIG. 4F depicts a flowchart illustrating a process for reading a directory in a shared filesystem consistent with some implementations of the current subject matter.

FIG. 4F depicts a flowchart illustrating a process 460 for reading an inode referenced by another directory in the shared filesystem 120 consistent with some implementations of the current subject matter. Referring to FIGS. 1, 2A, and 4F, a shared filesystem controller such as, for example, the first shared filesystem controller 130A and/or the second shared filesystem controller 130B can perform the process 460 in order to read metadata associated with an inode object such as, for example, the inode object 220. The inode object 220 may correspond to a file and/or a directory. Furthermore, the inode object 220 may be referenced by another directory in the shared filesystem 120 such as, for example, the directory corresponding to an inode object linked to the directory entry index object 230. As noted, in some implementations of the current subject matter, one or more partitions of the shared filesystem 120 can be stored in key-value stores across the distributed data storage system 100 including, for example, the first data store 114A at the first computing node 110A and/or the second data store 114B at the second computing node 110B. Accordingly, each file in a directory in the shared filesystem 120 such as, for example, the file and/or the directory corresponding to the inode object 220, can be stored as a key-value pair. The key associated with the key-value pair can correspond to an inode identifier of the inode object 220.

In some implementations of the current subject matter, the shared filesystem controller can respond to a request from the client 160 to read from the inode object 220 referenced by another directory in the shared filesystem 120 such as, for example, the directory corresponding to another inode object linked with the directory entry index object 230. As shown in FIG. 4F, the shared filesystem controller can respond to the request by at least performing a lookup based on the inode identifier of the inode object 220 which, as noted, may be a key of the key-value pair corresponding to the inode object 220. In the event the shared filesystem controller is unable to locate the inode object 220 based on the inode identifier, the shared filesystem controller can return an error indication to the client 160. Alternatively and/or additionally, if the shared filesystem controller is able to locate the inode object 220 based on the inode identifier, the shared filesystem controller can return, to the client 160, the inode object 220.

Figure 4G:
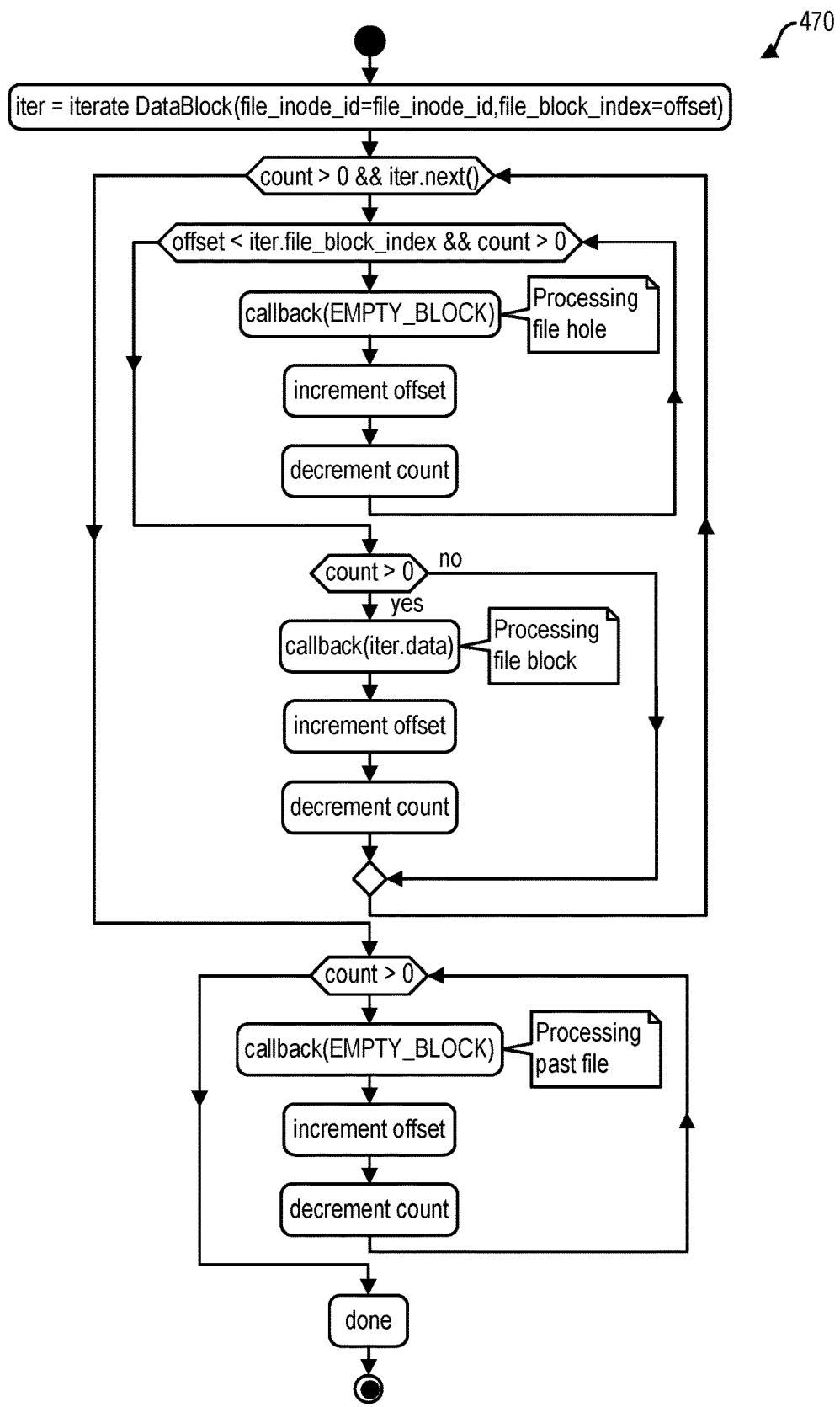
FIG. 4G depicts a flowchart illustrating a process for reading from a file in a shared filesystem consistent with some implementations of the current subject matter.

FIG. 4G depicts a flowchart illustrating a process 470 for reading from a file in the shared filesystem 120 consistent with some implementations of the current subject matter. Referring to FIGS. 1, 2A, and 4G, the shared filesystem controller can perform the process 470 in order to read from a file in the shared filesystem 120 such as, for example, the file corresponding to the inode object 220.

As shown in FIG. 2A, the inode object 220 corresponding to the file can be linked to the data block object 224, which can correspond to one of the data blocks storing the file. It should be appreciated that the file corresponding to the inode object 220 can be linked to any quantity of data block objects including, for example, zero data block objects when the file corresponding to the inode object 220 is an empty file.

In some implementations of the current subject matter, the data blocks storing the file can be indexed based on a composite key, which can be stored as part of the data block object corresponding to each of the data blocks storing the file. The composite key can include an inode identifier of the file, which can be stored as part of the inode object 220. Furthermore, the composite key can include a block index, which can be computed based on an offset associated with the corresponding data block. Referring again to FIG. 4G, in some implementations of the current subject matter, the shared filesystem controller can respond to the request to read from the file corresponding to the inode object 220 by iterating through the data blocks storing the file based on the block index.

Figure 4H:
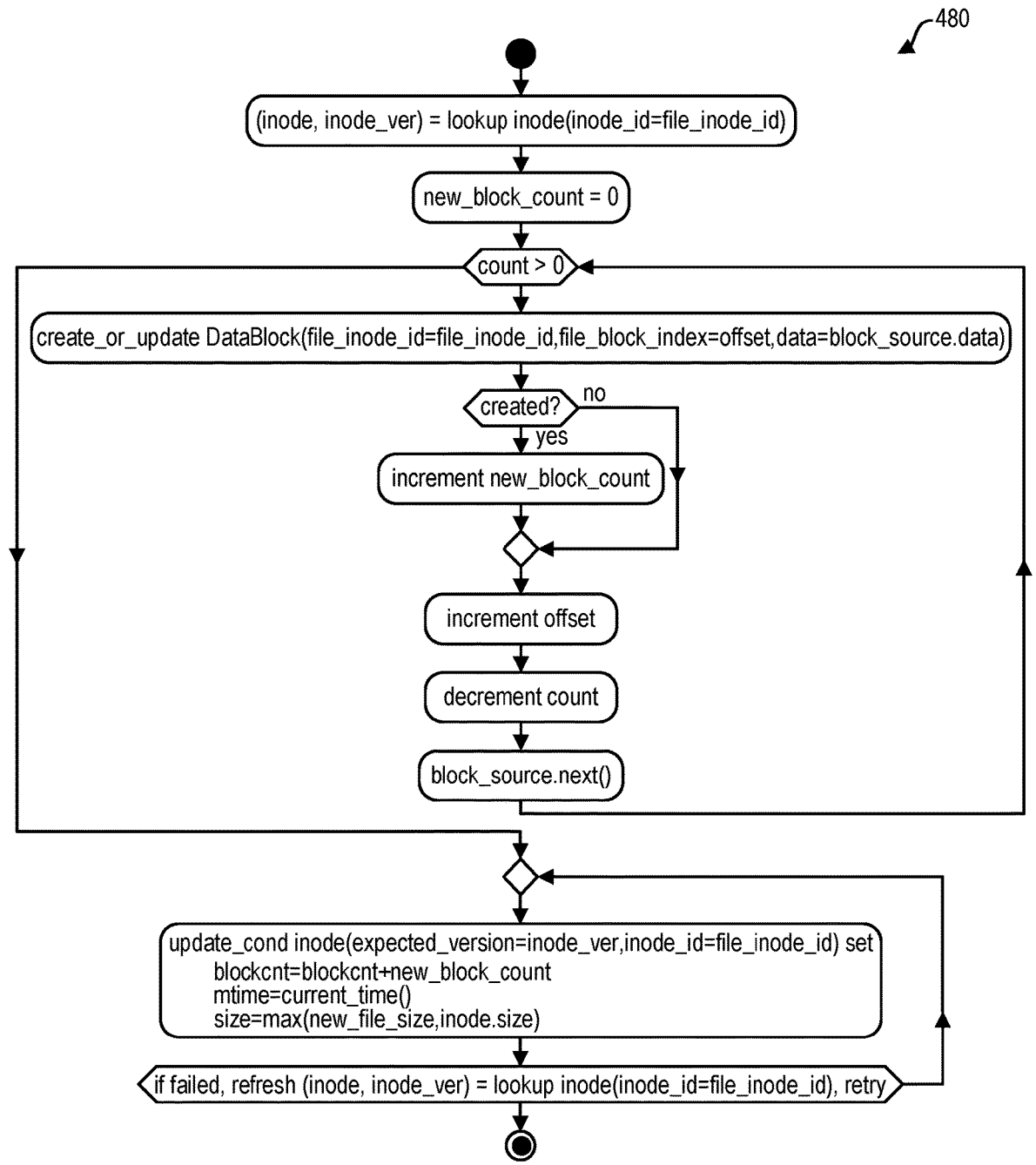
FIG. 4H depicts a flowchart illustrating a process for writing to a file in a shared filesystem consistent with some implementations of the current subject matter.

FIG. 4H depicts a flowchart illustrating a process 480 for writing to a file in the shared filesystem consistent with some implementations of the current subject matter. Referring to FIGS. 1, 2A, and 4H, the shared filesystem controller, for example, the first shared filesystem controller 130A and/or the second shared filesystem controller 130B can perform the process 480 in order to write to a file in the shared filesystem 120 such as, for example, the file corresponding to the inode object 220.

As noted, the data blocks storing the file corresponding to the inode object 220 can be indexed based on a composite key that includes an inode identifier and a block index. As shown in FIG. 4H, in some implementations of the current subject matter, the shared filesystem controller can respond to the request to write to the file corresponding to the inode object 220 by iterating through the data blocks storing the file based on the block index. It should be appreciated that writing to the file corresponding to the inode object 220 can include overwriting at least a portion of the existing data contained in the data blocks such as, for example, the data block corresponding to the data block object 224. Furthermore, writing to the file corresponding to the inode object 220 can increase the quantity of data blocks required to accommodate the file. As such, in order to respond to the request to write to the file corresponding to the inode object 220, the shared filesystem controller can generate new data blocks objects corresponding to the data blocks allocated for storing the file. Moreover, the shared filesystem controller can update the inode object 220, for example, the block count value stored in the inode object 220, to reflect the addition of new data blocks storing the corresponding file.

In some implementations of the current subject matter, the file corresponding to the inode object 220 can be truncated by at least deallocating the data blocks storing the file including, for example, the data block corresponding to the data block object 224. Truncating the file can include updating the inode object 220 to reflect the change in the quantity of data blocks storing the file. For instance, the block count value stored in the inode object 220 can be updated to reflect a decrease in the quantity of data blocks storing the file corresponding to the inode object 220.

Figure 5:
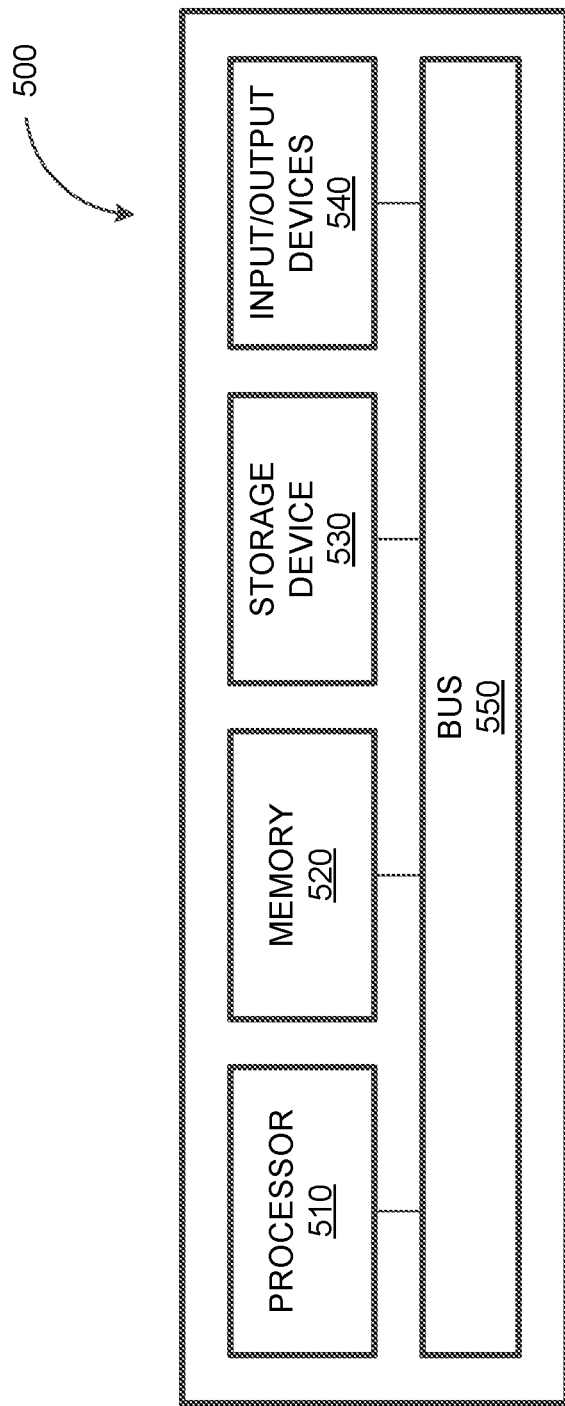
FIG. 5 depicts a block diagram illustrating a computing system consistent with some implementations of the current subject matter.

FIG. 5 depicts a block diagram illustrating a computing system 500 consistent with implementations of the current subject matter. Referring to FIGS. 1 and 5, the computing system 500 can be used to implement the distributed data storage system 100, for example, the shared filesystem controller, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the shared filesystem controller. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A distributed data storage system, comprising:
   at least one data processor; and
   at least one memory storing instructions which, when executed by the at least one data processor, cause operations comprising:

storing, at the distributed data storage system, a file that is part of a shared filesystem, the file being stored as an inode object and a series of data block objects in the shared filesystem;

generating the inode object corresponding to the one or more data blocks storing the file of the shared file system, wherein the inode object is linked to another inode object corresponding to a directory, wherein the inode object and the other inode object are further linked to a directory entry object and/or to a directory entry index object to at least indicate the file corresponding to the inode object is part of the directory corresponding to the other inode object; and responding to a first request from a client to open the file at least by generating, in the shared filesystem, a first open file object and a client index object, the first open file object and the client index object being linked to a client object corresponding to the client, the first open file object and the client index object further being linked to the inode object to at least indicate the file being accessed by the client.

2. The system of claim 1, wherein the client object is associated with an access time object storing a time when the client corresponding to the client object last accessed the shared filesystem, and wherein the access time object is replaced with another access time object in response to the client updating the time when the client corresponding to the client object last accessed the shared filesystem.

3. The system of claim 2, further comprising:
   determining, based at least on the access time object, that a connection between the client and the shared filesystem has timed out; and
   in response to determining that the connection between the client and the shared filesystem has timed out, removing, from the shared filesystem, the client object, the first open file object, and/or the client index object, the removal of the client object, the first open file object, and/or the client index object triggering a deletion of the inode object and/or the series of data block objects holding the file corresponding to the inode object based at least on the inode object not being referenced by another client and/or a directory.

4. The system of claim 1, further comprising:
   responding to a second request from the client to open the file by at least generating a second open file object, the second open file object being associated with a different discriminator value than the first open file object.

5. The system of claim 1, further comprising:
   responding to a second request from the client to close the file by at least deleting the first open file object and/or the client index object;
   in response to determining that a link count of the inode object is zero and the inode object is not associated with any client index objects, deleting the inode object and/or the series of data block objects storing the file corresponding to the inode object.

6. The system of claim 1, further comprising:
   responding to a second request to read from and/or write to the file corresponding to the inode object by at least iterating through the one or more data blocks, the iteration being based at least on a composite key stored in each data block object in the series of data block objects, and the composite key including an inode identifier of the file and a block index computed based at least on an offset associated with a corresponding data block.

7. The system of claim 6, wherein writing to one or more unallocated blocks for storing the file corresponding to the inode object further comprises:
- allocating a data block for storing data being written to the file;
- generating a data block object corresponding to the data block, the data block object being linked to the inode object corresponding to the file; and
- updating a block count value stored in the inode object.

8. The system of claim 1, wherein the distributed data storage system includes a first computing node and a second computing node, wherein one or more partitions of the shared filesystem is stored at a key-value store at each of the first computing node and the second computing node, and wherein each file in the shared filesystem is stored as a key-value pair in the key-value store at each of the first computing node and the second computing node.

9. The system of claim 1, wherein the client object is created in response to the client connecting to the shared filesystem, and wherein the client object is removed in response to the client disconnecting from the shared filesystem.

10. A method, comprising:
- storing, at the distributed data storage system, a file that is part of a shared filesystem, the file being stored as an inode object and a series of data block objects in the shared filesystem;
- generating the inode object corresponding to the one or more data blocks storing the file of the shared file system, wherein the inode object is linked to another inode object corresponding to a directory, wherein the inode object and the other inode object are further linked to a directory entry object and/or to a directory entry index object to at least indicate the file corresponding to the inode object is part of the directory corresponding to the other inode object; and
- responding to a first request from a client to open the file at least by generating, in the shared filesystem, a first open file object and a client index object, the first open file object and the client index object being linked to a client object corresponding to the client, the first open file object and the client index object further being linked to the inode object to at least indicate the file being accessed by the client.

11. The method of claim 10, wherein the client object is associated with an access time object storing a time when the client corresponding to the client object last accessed the shared filesystem, and wherein the access time object is replaced with another access time object in response to the client updating the time when the client corresponding to the client object last accessed the shared filesystem.

12. The method of claim 11, further comprising:
- determining, based at least on the access time object, that a connection between the client and the shared filesystem has timed out; and
- in response to determining that the connection between the client and the shared filesystem has timed out, removing, from the shared filesystem, the client object, the first open file object, and/or the client index object, the removal of the client object, the first open file object, and/or the client index object triggering a deletion of the inode object and/or the series of data block objects holding the file corresponding to the inode object based at least on the inode object not being referenced by another client and/or a directory.

13. The method of claim 10, further comprising:
- responding to a second request from the client to open the file by at least generating a second open file object, the second open file object being associated with a different discriminator value than the first open file object.

14. The method of claim 10, further comprising:
- responding to a second request from the client to close the file by at least deleting the first open file object and/or the client index object;
- in response to determining that a link count of the inode object is zero and the inode object is not associated with any client index objects, deleting the inode object and/or the series of data block objects storing the file corresponding to the inode object.

15. The method of claim 10, further comprising:
- responding to a second request to read from and/or write to the file corresponding to the inode object by at least iterating through the one or more data blocks, the iteration being based at least on a composite key stored in each data block in the series of data block objects, and the composite key including an inode identifier of the file and a block index computed based at least on an offset associated with a corresponding data block.

16. A non-transitory computer readable medium storing instructions, which when executed by at least one data processor, result in operations comprising:
- storing, at the distributed data storage system, a file that is part of a shared filesystem, the file being stored as an inode object and a series of data block objects in the shared filesystem;
- generating the inode object corresponding to the one or more data blocks storing the file of the shared file system, wherein the inode object is linked to another inode object corresponding to a directory, wherein the inode object and the other inode object are further linked to a directory entry object and/or to a directory entry index object to at least indicate the file corresponding to the inode object is part of the directory corresponding to the other inode object; and
- responding to a first request from a client to open the file at least by generating, in the shared filesystem, a first open file object and a client index object, the first open file object and the client index object being linked to a client object corresponding to the client, the first open file object and the client index object further being linked to the inode object to at least indicate the file being accessed by the client.

* * * * *